United States Patent
Lin et al.

(10) Patent No.: US 10,932,159 B2
(45) Date of Patent: Feb. 23, 2021

(54) DATA TRANSMISSION METHOD, DATA RECEIVING DEVICE, AND DATA SENDING DEVICE

(71) Applicant: HUAWEI TECHNOLOGIES CO., LTD., Guangdong (CN)

(72) Inventors: Nizhong Lin, Shanghai (CN); Lingli Pang, Shanghai (CN); Xiaoxiao Zheng, Shanghai (CN); Mingzeng Dai, Shanghai (CN); Chenguang Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 16/267,982

(22) Filed: Feb. 5, 2019

(65) Prior Publication Data

US 2019/0174356 A1 Jun. 6, 2019

Related U.S. Application Data

(63) Continuation of application No. PCT/CN2016/094700, filed on Aug. 11, 2016.

(51) Int. Cl.
*H04W 28/10* (2009.01)
*H04W 28/02* (2009.01)
(Continued)

(52) U.S. Cl.
CPC ....... *H04W 28/10* (2013.01); *H04W 28/0273* (2013.01); *H04W 28/06* (2013.01); *H04W 80/06* (2013.01)

(58) Field of Classification Search
None
See application file for complete search history.

(56) References Cited

U.S. PATENT DOCUMENTS

2002/0159396 A1   10/2002   Carlson et al.
2008/0080559 A1   4/2008    Singh
(Continued)

FOREIGN PATENT DOCUMENTS

CN   102130756 A   7/2011
CN   102761905 A   10/2012
(Continued)

OTHER PUBLICATIONS

WO 2014/186944, Pang et al.,"Acknowledgement Packet Transmission Method and Device Thereof"; PCT/CN2013/075939 (Translated Copy) (Year: 2014).*
(Continued)

*Primary Examiner* — Gregory B Sefcheck
*Assistant Examiner* — Amarnauth G Persaud
(74) *Attorney, Agent, or Firm* — Leydig, Voit & Mayer, Ltd.

(57) ABSTRACT

A data transmission method, a data receiving device, and a data sending device are disclosed. An RLC protocol entity unit of a data receive end receives a TCP acknowledgement from a TCP protocol entity unit of the data receive end; and the RLC protocol entity unit sends indication information to an RLC protocol entity unit of a data transmit end, where the indication information is used to indicate whether the RLC protocol entity unit needs to generate a TCP acknowledgement. The RLC protocol entity unit receives the indication information from the RLC protocol entity unit, and sends the TCP acknowledgement to a TCP protocol entity unit of the data transmit end based on the indication information, to ensure that the TCP protocol entity unit ultimately receives only one TCP ACK for one TCP data packet.

20 Claims, 7 Drawing Sheets

(51) Int. Cl.
*H04W 28/06* (2009.01)
*H04W 80/06* (2009.01)

(56) References Cited

U.S. PATENT DOCUMENTS

| | | | | |
|---|---|---|---|---|
| 2013/0250853 A1* | 9/2013 | Eravelli | ............... | H04L 69/163 370/328 |
| 2014/0050096 A1* | 2/2014 | Cui | ............... | H04L 1/1867 370/236 |
| 2015/0215218 A1* | 7/2015 | Kanamarlapudi | ...... | H04L 69/16 370/235 |
| 2016/0073449 A1* | 3/2016 | Pang | ............... | H04L 69/163 370/328 |
| 2017/0105138 A1* | 4/2017 | Huang | ............... | H04W 28/04 |
| 2018/0324790 A1* | 11/2018 | Ohta | ............... | H04L 1/1671 |

FOREIGN PATENT DOCUMENTS

| | | |
|---|---|---|
| CN | 104995950 A | 10/2015 |
| CN | 105578522 A | 5/2016 |
| CN | 104137507 | 11/2018 |
| EP | 2696621 A1 | 2/2014 |
| EP | 2933954 A1 | 3/2016 |
| EP | 2993954 A1 | 3/2016 |
| WO | 2014186944 A1 | 11/2014 |

OTHER PUBLICATIONS

Huawei "TCP Optimisation based on Context Awareness", 3GPP Draft; R3-161256, May 22, 2016, XP051106058, 3 pages.
Extended European Search Report dated May 10, 2019 in corresponding European Patent Application No. 16912269.4 (9 pages).
3GPP TS 36.322 V13.2.0 (Jun. 2016) "3rd Generation Partnership Project; Technical Specification Group Radio Access Network; Evolved Universal Terrestrial Radio Access (E-UTRA); Radio Link Control (RLC) protocol specification" (Release 13), total 45 pages.
International Search Report dated Apr. 27, 2017 in corresponding International Patent Application No. PCT/CN2016/094700.
International Search Report dated Apr. 27, 2017 in corresponding International Application No. PCT/CN2016/094700.

* cited by examiner

DATA TRANSMISSION METHOD, DATA RECEIVING DEVICE, AND DATA SENDING DEVICE

CROSS-REFERENCE TO RELATED APPLICATIONS

This application is a continuation of International Application No. PCT/CN2016/094700, filed on Aug. 11, 2016, the disclosure of which is hereby incorporated by reference in its entirety.

TECHNICAL FIELD

The present disclosure relates to the field of communications technologies, and in particular, to a data transmission method, a data receiving device, and a data sending device.

BACKGROUND

During wireless transmission of data, a network side device and a user side device usually follow a hierarchical data transmission model that includes an application layer, a transmission control protocol (TCP) layer, an internet protocol (IP) layer, a packet data convergence protocol (PDCP) layer, a radio link control (RLC) layer, a media access control (MAC) layer, and a physical (PHY) layer. When the network side device sends data to the user side device, the data starts from an application layer of the network side device, passes through a TCP layer, an IP layer, a PDCP layer, an RLC layer, an MAC layer, and a PHY layer of the network side device, reaches a PHY layer of the user side device through a transmission link, passes through an MAC layer, an RLC layer, a PDCP layer, an IP layer, and a TCP layer of the user side device, and finally reaches an application layer of the user side device, and vice versa.

To avoid occurrence of a data loss or a data error in a transmission process, a data receiving acknowledgement mechanism is introduced in the foregoing data transmission process. An acknowledgement at a TCP layer is to ensure that a correct TCP data packet is transmitted, and an acknowledgement in an acknowledged mode (AM) at an RLC layer is to ensure that a correct data packet is received at the RLC layer.

In one data packet transmission, an RLC-AM mode is used. Both an RLC layer and a TCP layer of a data receive end may send an acknowledgement message, and receiving of a TCP acknowledgement message may further trigger sending of an RLC acknowledgement message one more time. During transmission of a single data packet, particularly during transmission of a single small data packet, the foregoing one application layer data packet corresponds to a maximum of three acknowledgement messages from an air interface (i.e., an interface between a mobile terminal and a base station). When there is a separate TCP acknowledgement message, a relatively large data packet causes a waste of air interface resources. In addition, a large quantity of acknowledgement messages cause interference to other communication data. To avoid the problem, a solution for reducing TCP ACKs is proposed currently. To be specific, an acknowledgement at the RLC layer is used to replace an acknowledgement at the TCP layer. For example, a data transmit end maintains a mapping relationship between a TCP acknowledgement number and an RLC PDU. If the data transmit end receives a correct acknowledgement (ACK) instruction of an RLC service data unit (SDU) corresponding to a TCP data packet, the data transmit end determines that the TCP data packet is sent successfully, and generates a TCP ACK. The data receive end intercepts a generated TCP ACK, so that the TCP ACK does not need to be sent to the data transmit end.

A disadvantage of the solution is that the data receive end is not allowed to intercept all TCP ACKs. For example, a TCP ACK having a function of information exchange that is between TCP layers of the data transmit end and the data receive end and that includes time stamp exchange, adjustment of a receiving/sending window size, and the like needs to be sent to the data transmit end and is not allowed to be intercepted. Therefore, in a current data transmission process, sending of a TCP ACK is not controllable. Some TCP ACKs are generated and sent by the data transmit end, and some TCP ACKs are sent by the data receive end, causing uncertainty about processing of the TCP ACKs. In addition, an RLC ACK usually ensures only transmission reliability of an air interface. A TCP connection generally includes a wired TCP connection and a wireless TCP connection, and a TCP acknowledgement number included in the TCP ACK is a sequence number of a next to-be-received data packet (used to indicate that all data packets whose sequence numbers appear before the sequence number are correctly received). When a data packet loss or error occurs in the wired TCP connection, a TCP ACK cannot be accurately generated by using an RLC ACK.

SUMMARY

Embodiments of the present disclosure provide a data transmission method, a data receiving device, and a data sending device, to ensure that a TCP protocol entity unit of a data transmit end ultimately receives only one TCP ACK for one TCP data packet and that the received TCP ACK is accurate and reliable.

According to a first aspect, a data transmission method is provided. According to the method, when determining that a TCP data packet is correctly received, a TCP protocol entity unit of a data receive end sends a TCP ACK. An RLC protocol entity unit of the data receive end receives the TCP ACK sent by the TCP protocol entity unit of the data receive end, and determines whether an RLC protocol entity unit of a data transmit end needs to generate a TCP ACK. The RLC protocol entity unit of the data receive end generates indication information indicating whether the RLC protocol entity unit of the data transmit end needs to generate the TCP ACK, and sends the indication information to the RLC protocol entity unit of the data transmit end. The RLC protocol entity unit of the data transmit end receives the indication information sent by the RLC protocol entity unit of the data receive end, and determines whether the TCP ACK needs to be generated. The RLC protocol entity unit of the data transmit end sends the TCP ACK to a TCP protocol entity unit of the data transmit end based on the indication information.

In this embodiment of the present disclosure, if the RLC protocol entity unit of the data transmit end determines, based on the indication information, that the TCP ACK needs to be generated, the RLC protocol entity unit of the data transmit end generates the TCP ACK based on the indication information, and sends the generated TCP ACK to the TCP protocol entity unit of the data transmit end. If the RLC protocol entity unit of the data transmit end determines, based on the indication information, that the TCP ACK does not need to be generated, the RLC protocol entity unit of the data transmit end determines, based on the indication information, that the TCP ACK does not need to be generated, and the TCP protocol entity unit of the data receive end sends the TCP ACK to the TCP protocol entity unit of the data transmit end. By using the foregoing implementation, the TCP protocol entity unit of the data transmit end ultimately receives only one TCP ACK for one TCP data packet, and the received TCP ACK is accurate and reliable.

Optionally, the RLC protocol entity unit of the data receive end may determine, based on content of the TCP ACK generated by the TCP protocol entity unit of the data receive end, whether the TCP ACK needs to be generated. For example, if the TCP ACK includes data content, a header of the TCP ACK includes indication information used to indicate that the TCP ACK is a synchronization data packet (an SYN bit is set to 1, and an ACK bit is set to 1), the header of the TCP ACK includes indication information used to indicate that the TCP ACK is a finish data packet (a FIN bit is set to 1, and an ACK bit is set to 1), the header of the TCP ACK includes window size information, or a TCP option in the header of the TCP ACK includes at least one of the following options, such as multipath TCP information, selective acknowledgement information (SACK), a selective acknowledgement permitted (SACK permitted) option, or time stamp information, the RLC protocol entity unit of the data receive end determines that the RLC protocol entity unit of the data transmit end does not need to generate the TCP ACK, and generates indication information indicating that the RLC protocol entity unit of the data transmit end does not need to generate the TCP ACK. If the TCP ACK does not include data content, a header of the TCP ACK does not include indication information used to indicate that the TCP ACK is a synchronization (SYN) packet (an SYN bit is set to 0, and an ACK bit is set to 1), the header of the TCP ACK does not include indication information used to indicate that the TCP ACK is a finish data packet (a FIN bit is set to 0, and an ACK bit is set to 1), the header of the TCP ACK does not include window size information, and a TCP option in the header of the TCP ACK does not include multipath TCP information, SACK information, SACK permitted, or time stamp information, the RLC protocol entity unit of the data receive end determines that the RLC protocol entity unit of the data transmit end needs to generate the TCP ACK, and generates indication information indicating that the RLC protocol entity unit of the data transmit end needs to generate the TCP ACK.

In a possible design, if the RLC protocol entity unit of the data receive end determines that the RLC protocol entity unit of the data transmit end needs to generate the TCP ACK, the RLC protocol entity unit of the data receive end may send the indication information by using an RLC control protocol data unit (PDU) or an MAC control element (CE).

Optionally, in this embodiment of the present disclosure, when the indication information is sent by using an RLC PDU, a newly-defined RLC control PDU may be used to indicate that the RLC protocol entity unit of the data transmit end needs to generate the TCP ACK.

In another possible design, if the indication information is used to indicate that the RLC protocol entity unit of the data transmit end needs to generate the TCP ACK, the indication information is further used to determine an acknowledgement number of the TCP ACK that needs to be generated by the RLC protocol entity unit of the data transmit end, to indicate a TCP acknowledgement number of a TCP ACK that needs to be generated by the RLC protocol entity unit of the transmit end. After receiving the indication information, the RLC protocol entity unit of the data transmit end may generate the TCP acknowledgement based on indication information that is included in the indication information and that is used to determine the acknowledgement number of the TCP acknowledgement that needs to be generated by the RLC protocol entity unit of the data transmit end.

Optionally, the indication information used to determine the acknowledgement number of the TCP ACK that needs to be generated by the RLC protocol entity unit of the data transmit end may include a sequence number of an RLC PDU. After receiving the indication information, the RLC protocol entity unit of the data transmit end may determine a TCP acknowledgement number based on a mapping relationship between an RLC PDU and a TCP acknowledgement number, and further generate, based on the TCP acknowledgement number, the TCP ACK corresponding to the TCP acknowledgement number.

Optionally, the indication information used to determine the acknowledgement number of the TCP ACK that needs to be generated by the RLC protocol entity unit of the data transmit end may directly include a TCP acknowledgement number in the TCP ACK. Alternatively, when a TCP link is multiflow TCP link, the indication information may include a port number and a TCP acknowledgement number in the TCP ACK.

In still another possible design, if the indication information used to determine an acknowledgement number of the TCP ACK that needs to be generated by the RLC protocol entity unit of the data transmit end may include a sequence number of an RLC PDU, before the indication information is sent, when the RLC protocol entity unit of the data receive end does not finish RLC acknowledgement of the RLC PDU, the indication information may be further used to notify the RLC protocol entity unit of the data transmit end that the RLC PDU is correctly received, so that the RLC protocol entity unit of the data transmit end can acknowledge, based on the indication information, that the RLC PDU is correctly received, and perform a corresponding sliding window processing operation at an RLC layer.

In still another possible design, if the RLC protocol entity unit of the data receive end determines that the RLC protocol entity unit of the data transmit end does not need to generate the TCP ACK, the RLC protocol entity unit of the data receive end sends the indication information by using an RLC data PDU, where the RLC data PDU carries content of the TCP ACK.

In yet another possible design, the data receive end may send, by using an MAC CE, a result of whether the RLC protocol entity unit of the data transmit end needs to generate the TCP ACK to an MAC protocol entity unit of the data transmit end.

According to a second aspect, a data transmission method is provided. According to the method, a TCP protocol entity unit of a data transmit end has a capability of processing two TCP ACKs with a same acknowledgement number. To be specific, the TCP protocol entity unit of the data transmit end can process a TCP ACK that is generated by an RLC protocol entity unit of the data transmit end for a TCP data packet and a TCP ACK that is generated by a TCP protocol entity unit of a data receive end for the same TCP data packet. The TCP protocol entity unit of the data transmit end, the RLC protocol entity unit of the data transmit end, an RLC protocol entity unit of the data receive end, and the TCP protocol entity unit of the data receive end perform capability negotiation with each other. When the TCP protocol entity unit of the data transmit end has the capability of processing the two TCP ACKs with the same acknowledgement number, the RLC protocol entity unit of the data receive end receives a TCP data packet, and sends an RLC ACK to the RLC protocol entity unit of the data transmit end. The TCP protocol entity unit of the data receive end receives a TCP data packet, and sends a TCP ACK to the TCP protocol entity unit of the data transmit end. The RLC protocol entity unit of the data transmit end generates a TCP ACK, and sends the generated TCP ACK. The TCP protocol entity unit of the data transmit end obtains the TCP ACKs with a same TCP acknowledgement number and performs processing.

Optionally, the TCP protocol entity unit of the data transmit end, the RLC protocol entity unit of the data transmit end, the RLC protocol entity unit of the data receive end, and the TCP protocol entity unit of the data receive end may perform TCP acknowledgement function capability negotiation with each other in either of the following two implementations:

In one implementation, the TCP protocol entity unit of the data transmit end, the RLC protocol entity unit of the data transmit end, the RLC protocol entity unit of the data receive end, and the TCP protocol entity unit of the data receive end perform TCP acknowledgement function capability negotiation with each other in the following manner: The TCP protocol entity unit of the data transmit end sends the capability of supporting processing of the two TCP ACKs with the same acknowledgement number to the RLC protocol entity unit of the data transmit end. The RLC protocol entity unit of the data transmit end and the TCP protocol entity unit of the data transmit end perform TCP acknowledgement function capability negotiation with each other. The RLC protocol entity unit of the data transmit end and the RLC protocol entity unit of the data receive end perform TCP acknowledgement function capability negotiation with each other. The RLC protocol entity unit of the data receive end and the TCP protocol entity unit of the data transmit end need to perform TCP acknowledgement function capability negotiation with each other.

In the other implementation, the TCP protocol entity unit of the data transmit end and the TCP protocol entity unit of the data receive end perform TCP acknowledgement function capability negotiation with each other. The TCP protocol entity unit of the data transmit end notifies the RLC protocol entity unit of the data transmit end of a result of the capability negotiation. The RLC protocol entity unit of the transmit end and the RLC protocol entity unit of the receive end further perform TCP acknowledgement function capability negotiation, determine whether to enable a TCP ACK reduction function, and notify the TCP protocol entity unit of the transmit end of the result.

Optionally, in this embodiment of the present disclosure, the TCP protocol entity unit of the data transmit end may process, based on a time sequence for receiving the TCP ACKs, the TCP ACK generated by the RLC protocol entity unit and the TCP ACK generated by the TCP protocol entity unit of the data receive end.

In this embodiment of the present disclosure, if a time when the TCP protocol entity unit of the data transmit end obtains the TCP ACK generated by the RLC protocol entity unit is earlier than a time when the TCP protocol entity unit of the data transmit end obtains the TCP ACK generated by the TCP protocol entity unit of the data receive end, the data transmit end determines, based on the TCP ACK generated by the RLC protocol entity unit, that the data packet with the TCP acknowledgement number is correctly received, and processes data content information included in the TCP ACK generated by the TCP protocol entity unit of the data receive end. If a time when the data transmit end obtains the TCP ACK generated by the RLC protocol entity unit is later than a time when the data transmit end obtains the TCP ACK generated by the TCP protocol entity unit of the data receive end, the data transmit end determines, based on the TCP ACK generated by the TCP protocol entity unit of the data receive end, that the data packet with the TCP acknowledgement number is correctly received, processes data content information included in the TCP ACK generated by the TCP protocol entity unit of the data receive end, and discards the TCP ACK generated by the RLC protocol entity unit.

In a possible design, in this embodiment of the present disclosure, a method for identifying the TCP ACK generated by the RLC protocol entity unit of the data transmit end may be used, so that the TCP protocol entity unit of the data transmit end can distinguish between the TCP ACK generated by the RLC protocol entity unit of the data transmit end and the TCP ACK generated by the TCP protocol entity unit of the data receive end, and perform processing.

In another possible design, on a basis of TCP acknowledgement function capability negotiation performed between the TCP protocol entity unit of the data transmit end, the RLC protocol entity unit of the data transmit end, the RLC protocol entity unit of the data receive end, and the TCP protocol entity unit of the data receive end, the RLC protocol entity unit of the data transmit end further needs to have a capability of TCP data transmission acknowledgement on a wired network side, perform integrity check on each arrival TCP/IP packet, read a TCP acknowledgement number of each arrival TCP/IP packet, and record an acknowledgement number of a correctly received TCP data packet, so as to determine a lost or an erroneous TCP data packet on a wired network, and to correctly generate the TCP ACK.

According to a third aspect, a communication method is provided. According to the communication method, an RLC protocol entity unit of a data transmit end may add a poll indication to a last fragment (namely, a last RLC PDU) of an RLC SDU that is sent to an RLC protocol entity unit of a data receive end, to trigger the RLC protocol entity unit of the data receive end to send an RLC ACK. The method can ensure that the RLC protocol entity unit of the data transmit end can receive the RLC ACK as soon as possible and further generate a TCP ACK as soon as possible.

Optionally, in this embodiment of the present disclosure, when triggering the RLC ACK, the receive end may not be limited by a status prohibit mechanism. In other words, regardless of whether a status prohibit timer runs, the data receive end immediately returns the RLC ACK, provided that the poll indication is received. In this way, the RLC protocol entity unit of the data receive end sends the RLC ACK in a timelier manner, ensuring that the RLC protocol entity unit of the data transmit end can receive the RLC ACK as soon as possible and further generate the TCP ACK as soon as possible.

According to a fourth aspect, a data receiving device is provided. The data receiving device has a function of implementing all protocol entity units of the data receive end in the foregoing method designs. The function may be implemented by hardware, or may be implemented by hardware by executing corresponding software. The hardware or the software includes one or more modules corresponding to the foregoing function. The modules may be software and/or hardware.

In a possible design, the data receiving device includes a processing module and a sending module. The processing module is configured to determine whether a Radio Link Control (RLC) protocol entity unit of the data receiving device receives a Transmission Control Protocol (TCP)

acknowledgement sent by a TCP protocol entity unit of the data receiving device. The sending module is configured to: when the processing module determines that the RLC protocol entity unit of the data receiving device receives the TCP acknowledgement sent by the TCP protocol entity unit of the data receiving device, send indication information to an RLC protocol entity unit of a data transmit end, where the indication information is used to indicate whether the RLC protocol entity unit of the data transmit end needs to generate a TCP acknowledgement.

The processing module is further configured to: before the sending module sends the indication information to the RLC protocol entity unit of the data transmit end, determine whether the RLC protocol entity unit of the data transmit end needs to generate the TCP acknowledgement, and generate the indication information indicating whether the RLC protocol entity unit of the data transmit end needs to generate the TCP acknowledgement; and if the TCP acknowledgement includes data content, a header of the TCP acknowledgement includes indication information used to indicate that the TCP acknowledgement is a synchronization data packet, the header of the TCP acknowledgement includes indication information used to indicate that the TCP acknowledgement is a finish data packet, the header of the TCP acknowledgement includes window size information, or a TCP option in the header of the TCP acknowledgement includes at least one of multipath TCP information, selective acknowledgement information, a selective acknowledgement permitted option, or time stamp information, determine that the RLC protocol entity unit of the data transmit end does not need to generate the TCP acknowledgement, and generate indication information indicating that the RLC protocol entity unit of the data transmit end does not need to generate the TCP acknowledgement; or if the TCP acknowledgement does not include data content, a header of the TCP acknowledgement does not include indication information used to indicate that the TCP acknowledgement is a synchronization (SYN) packet, the header of the TCP acknowledgement does not include indication information used to indicate that the TCP acknowledgement is a finish data packet, the header of the TCP acknowledgement does not include window size information, and a TCP option in the header of the TCP acknowledgement does not include multipath TCP information, selective acknowledgement information, a selective acknowledgement permitted option, or time stamp information, determine that the RLC protocol entity unit of the data transmit end needs to generate the TCP acknowledgement, and generate indication information indicating that the RLC protocol entity unit of the data transmit end needs to generate the TCP acknowledgement.

The sending module sends the indication information to the RLC protocol entity unit of the data transmit end in the following manner: sending the indication information by using an RLC control protocol data unit or an MAC control element.

If the indication information is used to indicate that the RLC protocol entity unit of the data transmit end needs to generate the TCP acknowledgement, the indication information further includes indication information used to determine an acknowledgement number of the TCP acknowledgement that needs to be generated by the RLC protocol entity unit of the data transmit end.

The indication information used to determine the acknowledgement number of the TCP acknowledgement that needs to be generated by the RLC protocol entity unit of the data transmit end is a sequence number that is of an acknowledgement of an RLC protocol data unit (PDU) and that is sent by the RLC protocol entity unit of the data receiving device to the RLC protocol entity unit of the data transmit end.

Before the sending module sends the indication information to the RLC protocol entity unit of the data transmit end, if the sending module does not finish sending the sequence number of the acknowledgement of the RLC PDU to the RLC protocol entity unit of the data transmit end, the indication information is further used to indicate that the RLC PDU is correctly received.

The sending module sends the indication information to the RLC protocol entity unit of the data transmit end in the following manner: if the RLC protocol entity unit of the data transmit end does not need to generate the TCP acknowledgement, sending the indication information by using an RLC data PDU, where the RLC data PDU carries content of the TCP acknowledgement.

In another possible design, the data receiving device includes a processor and a transmitter. The processor is configured to determine whether a Radio Link Control (RLC) protocol entity unit of the data receiving device receives a Transmission Control Protocol (TCP) acknowledgement sent by a TCP protocol entity unit of the data receiving device. The transmitter is configured to: when the processor determines that the RLC protocol entity unit of the data receiving device receives the TCP acknowledgement sent by the TCP protocol entity unit of the data receiving device, send indication information to an RLC protocol entity unit of a data transmit end, where the indication information is used to indicate whether the RLC protocol entity unit of the data transmit end needs to generate a TCP acknowledgement.

The processor is further configured to: before the transmitter sends the indication information to the RLC protocol entity unit of the data transmit end, determine whether the RLC protocol entity unit of the data transmit end needs to generate the TCP acknowledgement, and generate the indication information indicating whether the RLC protocol entity unit of the data transmit end needs to generate the TCP acknowledgement; and if the TCP acknowledgement includes data content, a header of the TCP acknowledgement includes indication information used to indicate that the TCP acknowledgement is a synchronization data packet, the header of the TCP acknowledgement includes indication information used to indicate that the TCP acknowledgement is a finish data packet, the header of the TCP acknowledgement includes window size information, or a TCP option in the header of the TCP acknowledgement includes at least one of multipath TCP information, selective acknowledgement information, a selective acknowledgement permitted option, or time stamp information, determine that the RLC protocol entity unit of the data transmit end does not need to generate the TCP acknowledgement, and generate indication information indicating that the RLC protocol entity unit of the data transmit end does not need to generate the TCP acknowledgement; or if the TCP acknowledgement does not include data content, a header of the TCP acknowledgement does not include indication information used to indicate that the TCP acknowledgement is a synchronization (SYN) packet, the header of the TCP acknowledgement does not include indication information used to indicate that the TCP acknowledgement is a finish data packet, the header of the TCP acknowledgement does not include window size information, and a TCP option in the header of the TCP acknowledgement does not include multipath TCP information, selective acknowledgement information, a selective acknowledgement permitted option, or time stamp information, determine that the RLC protocol entity unit of the data transmit end needs to generate the TCP acknowledgement, and generate indication information indicating that the RLC protocol entity unit of the data transmit end needs to generate the TCP acknowledgement.

The transmitter sends the indication information to the RLC protocol entity unit of the data transmit end in the following manner: sending the indication information by using an RLC control protocol data unit or an MAC control element.

If the indication information is used to indicate that the RLC protocol entity unit of the data transmit end needs to generate the TCP acknowledgement, the indication information further includes indication information used to determine an acknowledgement number of the TCP acknowledgement that needs to be generated by the RLC protocol entity unit of the data transmit end.

The indication information used to determine the acknowledgement number of the TCP acknowledgement that needs to be generated by the RLC protocol entity unit of the data transmit end is a sequence number that is of an acknowledgement of an RLC protocol data unit (PDU) and that is sent by the RLC protocol entity unit of the data receiving device to the RLC protocol entity unit of the data transmit end.

Before the transmitter sends the indication information to the RLC protocol entity unit of the data transmit end, if the transmitter does not finish sending the sequence number of the acknowledgement of the RLC PDU to the RLC protocol entity unit of the data transmit end, the indication information is further used to indicate that the RLC PDU is correctly received.

The transmitter sends the indication information to the RLC protocol entity unit of the data transmit end in the following manner: if the RLC protocol entity unit of the data transmit end does not need to generate the TCP acknowledgement, sending the indication information by using an RLC data PDU, where the RLC data PDU carries content of the TCP acknowledgement.

The data receiving device may further include a memory and a bus. The memory is configured to: be coupled to the processor, and store program code and data of the data receiving device. The transmitter, the processor, and the memory may be connected to each other by using the bus.

According to a fifth aspect, a data sending device is provided. The data sending device has a function of implementing all protocol entity units of the data transmit end in the foregoing method designs. The function may be implemented by hardware, or may be implemented by hardware by executing corresponding software. The hardware or the software includes one or more modules corresponding to the foregoing function. The modules may be software and/or hardware.

In a possible design, the data sending device includes a receiving module and a sending module. The receiving module is configured to receive indication information sent by an RLC protocol entity unit of a data receive end, where the indication information is used to indicate whether an RLC protocol entity unit of the data sending device needs to generate a TCP acknowledgement. The sending module is configured to send a TCP acknowledgement to a TCP protocol entity unit of the data sending device based on the indication information received by the receiving module.

The data sending device further includes a processing module. The processing module is configured to generate the TCP acknowledgement based on the indication information. The sending module is further configured to send the generated TCP acknowledgement to the TCP protocol entity unit of the data sending device.

The sending module is configured to: before the receiving module receives the indication information sent by the RLC protocol entity unit of the data receive end, send an RLC protocol data unit (PDU) to the RLC protocol entity unit of the data receive end. The data sending device further includes a processing module, configured to: when the RLC PDU is a last fragment of an RLC service data unit (SDU), add a poll indication to the RLC PDU, and trigger the RLC protocol entity unit of the data receive end to send an RLC acknowledgement.

The processing module generates the TCP acknowledgement based on the indication information in the following manner: generating the TCP acknowledgement based on indication information that is included in the indication information and that is used to determine an acknowledgement number of the TCP acknowledgement that needs to be generated by the RLC protocol entity unit of the data sending device.

The processing module generates the TCP acknowledgement in the following manner based on the indication information that is included in the indication information and that is used to determine the acknowledgement number of the TCP acknowledgement that needs to be generated by the RLC protocol entity unit of the data sending device: determining, based on a sequence number that is of an acknowledgement of an RLC protocol data unit (PDU) and that is included in the indication information, the acknowledgement number of the TCP acknowledgement that needs to be generated, where the RLC PDU is sent by the RLC protocol entity unit of the data receive end to the RLC protocol entity unit of the data sending device; and generating the TCP acknowledgement based on the acknowledgement number of the TCP acknowledgement.

The processing module is further configured to: after the receiving module receives the indication information sent by the RLC protocol entity unit of the data receive end, if the RLC protocol entity unit of the data receive end does not finish sending the sequence number of the acknowledgement of the RLC PDU, acknowledge, based on the indication information, that the RLC PDU is correctly received.

In another possible design, the data sending device includes a receiver and a transmitter. The receiver is configured to receive indication information sent by an RLC protocol entity unit of a data receive end, where the indication information is used to indicate whether an RLC protocol entity unit of the data sending device needs to generate a TCP acknowledgement. The transmitter is configured to send a TCP acknowledgement to a TCP protocol entity unit of the data sending device based on the indication information received by the receiver.

The data sending device further includes a processor. The processor is configured to generate the TCP acknowledgement based on the indication information. The transmitter is further configured to send the generated TCP acknowledgement to the TCP protocol entity unit of the data sending device.

The transmitter is configured to: before the receiver receives the indication information sent by the RLC protocol entity unit of the data receive end, send an RLC protocol data unit (PDU) to the RLC protocol entity unit of the data receive end. The data sending device further includes a processor, configured to: when the RLC PDU is a last fragment of an RLC service data unit (SDU), add a poll indication to the RLC PDU, and trigger the RLC protocol entity unit of the data receive end to send an RLC acknowledgement.

The processor generates the TCP acknowledgement based on the indication information in the following manner: generating the TCP acknowledgement based on indication information that is included in the indication information and that is used to determine an acknowledgement number of the TCP acknowledgement that needs to be generated by the RLC protocol entity unit of the data sending device.

The processor generates the TCP acknowledgement in the following manner based on the indication information that is included in the indication information and that is used to determine the acknowledgement number of the TCP acknowledgement that needs to be generated by the RLC protocol entity unit of the data sending device: determining, based on a sequence number that is of an acknowledgement of an RLC protocol data unit (PDU) and that is included in the indication information, the acknowledgement number of the TCP acknowledgement that needs to be generated, where the RLC PDU is sent by the RLC protocol entity unit of the data receive end to the RLC protocol entity unit of the data sending device; and generating the TCP acknowledgement based on the acknowledgement number of the TCP acknowledgement.

The processor is further configured to: after the receiver receives the indication information sent by the RLC protocol entity unit of the data receive end, if the RLC protocol entity unit of the data receive end does not finish sending the sequence number of the acknowledgement of the RLC PDU, acknowledge, based on the indication information, that the RLC PDU is correctly received.

According to a sixth aspect, an embodiment of the present disclosure provides a computer storage medium, configured to store a computer software instruction used by the foregoing data receiving device. The computer software instruction includes a program used by the data receiving device to perform the foregoing methods.

According to a seventh aspect, an embodiment of the present disclosure provides a computer storage medium, configured to store a computer software instruction used by the foregoing data sending device. The computer software instruction includes a program used by the data sending device to perform the foregoing methods.

According to the data transmission method, the data receiving device, and the data sending device that are provided in the embodiments of the present disclosure, In an aspect, the data receiving device determines whether the RLC protocol entity unit of the data transmit end needs to generate the TCP ACK, and sends, to the data sending device, the indication information indicating whether the TCP ACK needs to be generated, so that the TCP protocol entity unit of the data sending device ultimately receives only one TCP ACK for one TCP data packet, and the received TCP ACK is accurate and reliable. In another aspect, the TCP protocol entity unit of the data transmit end, the RLC protocol entity unit of the data transmit end, the RLC protocol entity unit of the data receive end, and the TCP protocol entity unit of the data receive end perform TCP acknowledgement function capability negotiation with each other, and when the TCP protocol entity unit of the data transmit end has the capability of processing the two TCP ACKs with the same acknowledgement number, the TCP protocol entity unit of the data transmit end processes the two TCP ACKs with the same acknowledgement number. In still another aspect, the RLC protocol entity unit of the data transmit end may add the poll indication to the last fragment of the RLC SDU that is sent to the RLC protocol entity unit of the data receive end, to trigger the RLC protocol entity unit of the data receive end to send the RLC ACK. The method can ensure that the RLC protocol entity unit of the data transmit end can receive the RLC ACK as soon as possible and further generate the TCP ACK as soon as possible.

DESCRIPTION OF EMBODIMENTS

The following describes in detail the technical solutions in the embodiments of the present disclosure with reference to the accompanying drawings in the embodiments of the present disclosure. Apparently, the described embodiments are some rather than all of the embodiments of the present disclosure.

Figure 1:
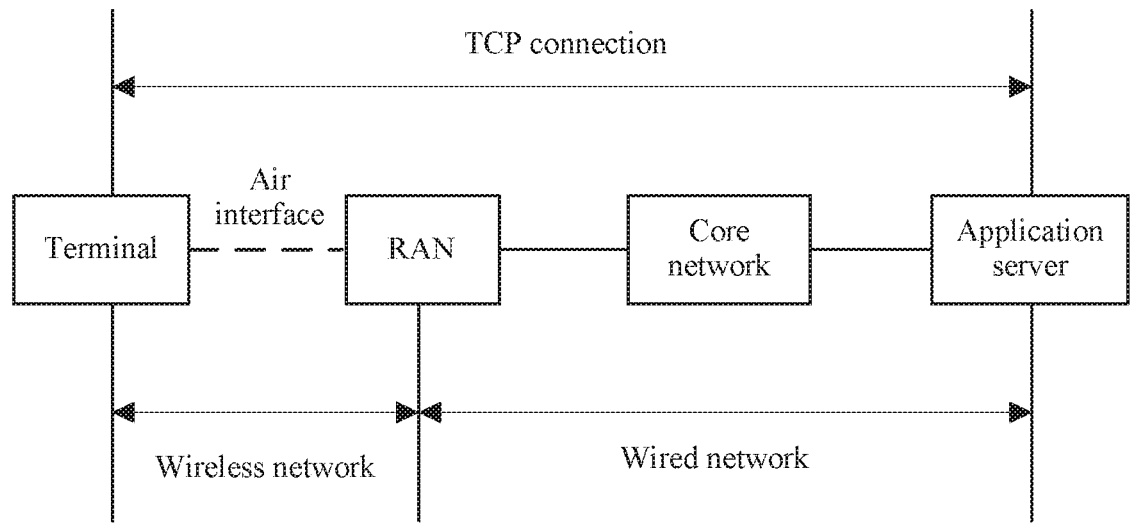
FIG. 1 is a schematic diagram of data exchange between a terminal and an application server in a wireless communications system according to an embodiment of the present disclosure.

A data transmission method provided in an embodiment of the present disclosure may be applied to data transmission of a wireless communications system. A data receive end and a data transmit end exchange data by using a radio access network (RAN) and a core network. A TCP connection may be further established between the data receive end and the data transmit end, and the TCP protocol is used for data transmission. For example, as shown in FIG. 1, a terminal and an application server in a wireless communications system exchange data. The terminal is connected to an RAN by using an air interface, and is connected to the application server by using a core network. A network between the terminal and the RAN may be referred to as a wireless network, and a network between the RAN and the server may be referred to as a wired network. A TCP connection is established for data transmission between the application server and the terminal.

When the data receive end and the data transmit end in the wireless communications system exchange data, access layers include PDCP, RLC, MAC, and PHY layers, and non-access layers include TCP and IP layers.

In this embodiment of the present disclosure, for ease of description, processing operations on TCP layers and RLC layers of the data receive end and the data transmit end are mainly described, and processing procedures on other protocol layers such as IP layers and PDCP layers between the TCP layers and the RLC layers are omitted. For ease of understanding, in the following embodiments of the present disclosure, an entity executing a TCP layer protocol is referred to as a TCP protocol entity unit, and the TCP protocol entity unit belongs to a TCP layer and corresponds to the TCP layer. An entity executing an RLC layer protocol is referred to as an RLC protocol entity unit, and the RLC protocol entity unit belongs to an RLC layer and corresponds to the RLC layer.

Figure 2:
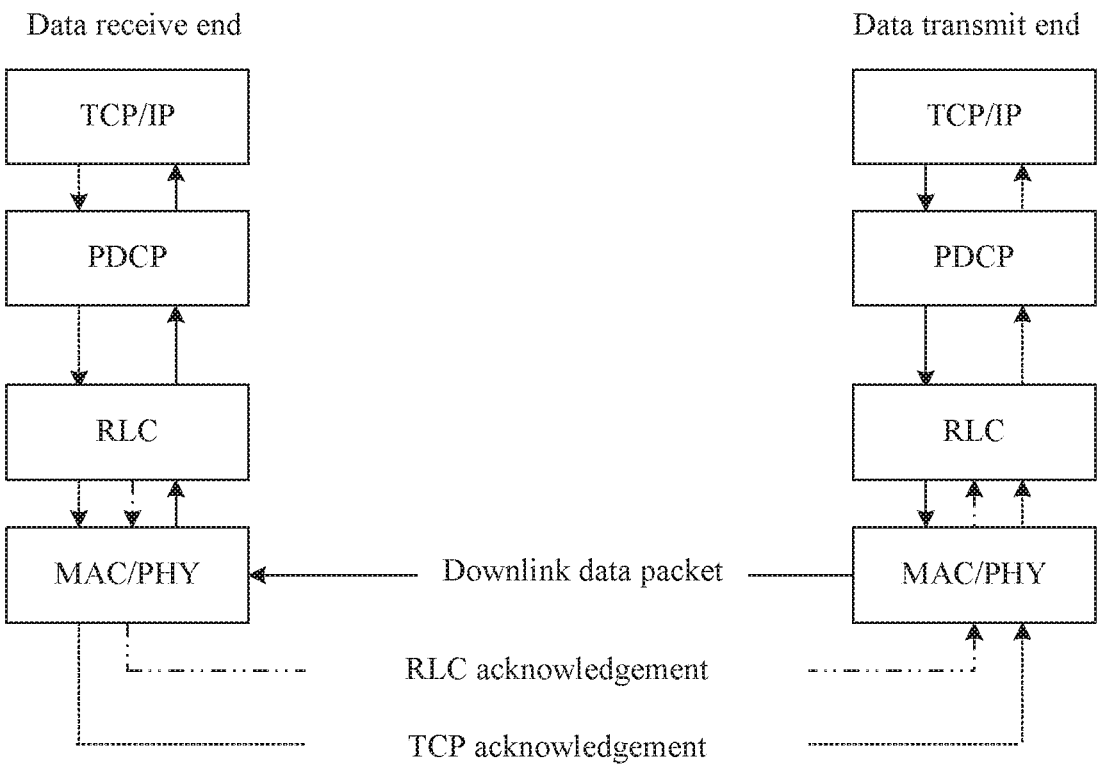
FIG. 2 is a schematic diagram of a downlink data transmission process according to an embodiment of the present disclosure.

In a wireless communications system, in one TCP/IP data packet transmission process, there is not only a TCP ACK, but there may also be an ACK generated at an access layer, such as an RLC ACK or an MAC ACK. FIG. 2 is a schematic diagram of a downlink data transmission process. When a TCP mode is used at a transport layer, and an RLC-AM mode is used at an RLC layer, both an RLC ACK and a TCP ACK exist in a data transmission.

Figure 3:
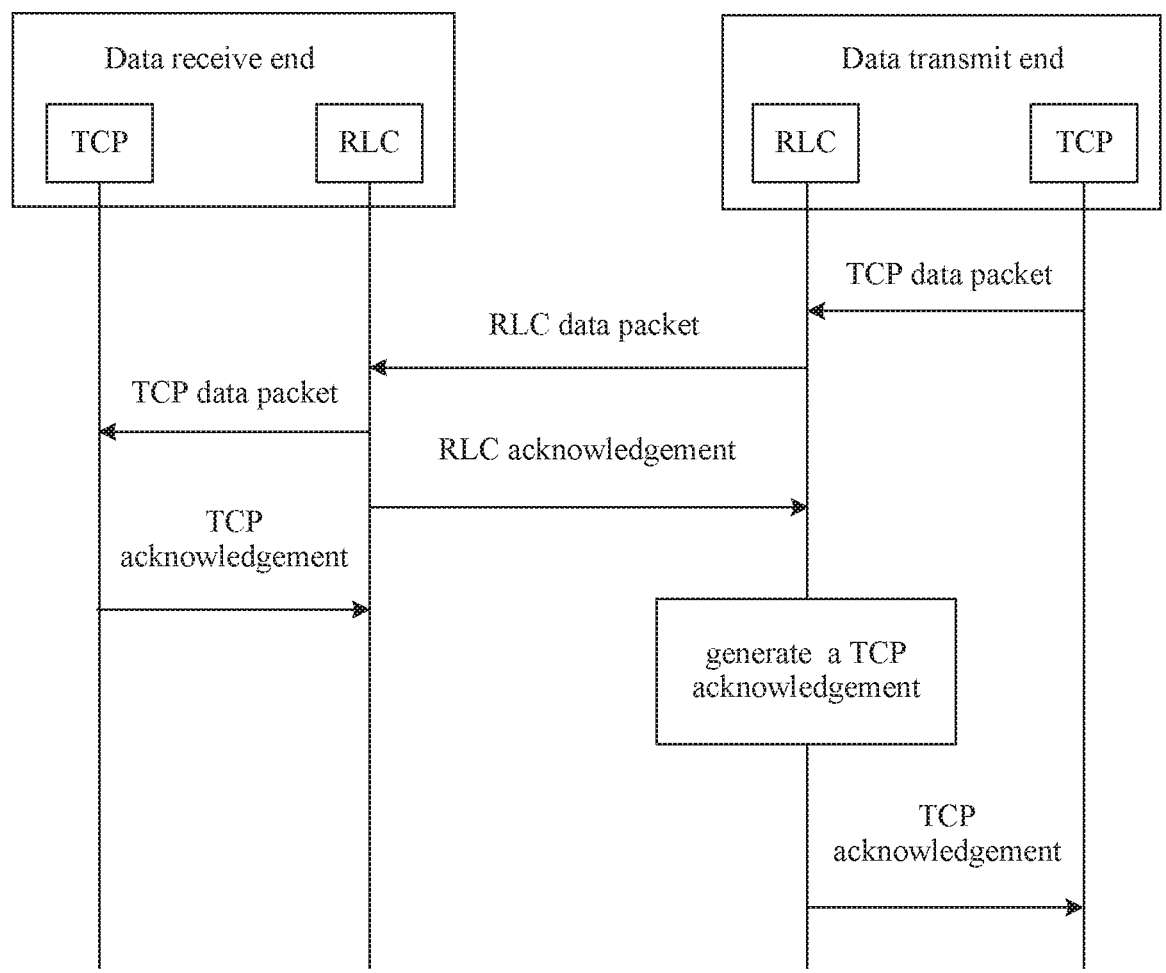
FIG. 3 is a schematic flowchart of generating a TCP ACK at an RLC layer of a data transmit end according to an embodiment of the present disclosure.

FIG. 3 is a schematic flowchart of generating a TCP ACK at an RLC layer of a data transmit end. As shown in FIG. 3, a TCP protocol entity unit of the data transmit end sends a TCP data packet to an RLC protocol entity unit of the data transmit end. The RLC protocol entity unit of the data transmit end obtains the TCP data packet in a form of an RLC service data unit (SDU), processes the RLC SDU as an RLC layer data packet, and sends the RLC layer data packet to an RLC protocol entity unit of a data receive end. After obtaining an RLC PDU corresponding to the TCP data packet, the RLC protocol entity unit of the data receive end sends the RLC PDU to a TCP protocol entity unit of the data receive end. The TCP protocol entity unit of the data receive end and the RLC protocol entity unit of the data receive end determine whether the TCP/IP data packet is correctly received. If the TCP/IP data packet is correctly received, the RLC protocol entity unit of the data receive end feeds back an RLC ACK, and the TCP protocol entity unit of the data receive end feeds back a TCP ACK. To reduce sending of TCP ACKs through an air interface (particularly when downlink TCP data transmission is performed and a signal in uplink coverage is relatively poor, a TCP ACK is relatively large and may be retransmitted several times), the RLC protocol entity unit of the data transmit end may generate a TCP ACK and send the TCP ACK to the TCP protocol entity unit of the data transmit end, so that the TCP protocol entity unit of the data transmit end can determine that the sent TCP data packet is correctly received, without waiting for the TCP ACK sent by the TCP protocol entity unit of the data receive end. This reduces a round trip time (RTT) of sending and receiving of the TCP data packet and improves a TCP throughput. Sending the TCP ACK by the RLC protocol entity unit of the data transmit end needs to satisfy the following trigger condition: When an RLC SDU includes a poll indication or it is detected that an RLC protocol data unit (PDU) is incorrectly received (after a reordering timer (t-Reordering) expires, the RLC PDU is still not correctly received), and a status prohibit timer (t-StatusProhibit) is not in a running period.

It should be noted that a description such as "a TCP protocol entity unit of the data transmit end sends a TCP data packet to an RLC protocol entity unit of the data transmit end" in this embodiment of the present disclosure is merely a brief description. In an actual data transmission process, the TCP data packet may further need to pass through an IP layer, a PDCP layer, and the like, and vice versa. A description such as "the RLC protocol entity unit of the data transmit end processes the TCP data packet as an RLC layer data packet" is also a brief description. In this case, the RLC protocol entity unit may receive a PDCP data packet including the TCP data packet.

In the data transmission method shown in FIG. 2 and FIG. 3, when the RLC protocol entity unit of the data transmit end generates the TCP data packet, there are the following three technical problems:

(1) The TCP protocol entity unit of the data transmit end may receive two TCP ACKs with a same acknowledgement number. One TCP ACK is generated and sent by the RLC protocol entity unit of the data transmit end, and the other TCP ACK is generated and sent by the TCP protocol entity unit of the data receive end, causing uncertainty of processing the TCP ACKs.

(2) The RLC protocol entity unit of the data transmit end can determine, based only on an RLC layer acknowledgement number (to acknowledge that a data packet whose RLC layer acknowledgement number appears before the RLC layer acknowledgement number is correctly received) included in the RLC ACK sent by the data receive end and a mapping relationship that is between a TCP acknowledgement number and a data sequence number of the RLC layer and that is maintained by the RLC protocol entity unit of the data transmit end, that the TCP data packet corresponding to the TCP acknowledgement number is correctly received. The RLC protocol entity unit of the data transmit end cannot determine a lost or an erroneous TCP data packet on a wired network. An acknowledgement number of the TCP ACK is used to acknowledge that all TCP data packets whose acknowledgement numbers appear before the acknowledgement number are correctly received. Therefore, the RLC protocol entity unit of the data transmit end cannot correctly generate the TCP ACK.

(3) The RLC protocol entity unit of the data receive end does not send an RLC ACK when each RLC PDU is received, but triggers sending of an RLC ACK when the RLC protocol entity unit of the data receive end determines that the RLC PDU includes a poll indication or detects that the RLC PDU is incorrectly received and a t-StatusProhibit is not in a running period. Consequently, the RLC protocol entity unit of the data transmit end cannot receive the RLC ACK in a timely manner, and further cannot generate and send the TCP ACK in a timely manner.

For the foregoing technical problems (1) and (2), an embodiment of the present disclosure provides a data transmission method. According to the method, a data receive end determines whether an RLC protocol entity unit of a data transmit end needs to generate a TCP ACK, and sends, to the RLC protocol entity unit of the data transmit end, indication information used to indicate whether the RLC protocol entity unit of the data transmit end needs to generate the TCP ACK. When the data receive end needs to send a TCP ACK, the data receive end may send, to the RLC protocol entity unit of the data transmit end, indication information used to indicate that the RLC protocol entity unit of the data transmit end does not need to generate the TCP ACK. When the data receive end does not need to send a TCP ACK, the data receive end may send, to the RLC protocol entity unit of the data transmit end, indication information used to indicate that the RLC protocol entity unit of the data transmit end needs to generate the TCP ACK. Using the foregoing manner can ensure that a TCP protocol entity unit of the data transmit end ultimately receives only one TCP ACK for one TCP data packet and the received TCP ACK is accurate and reliable.

Figure 4:
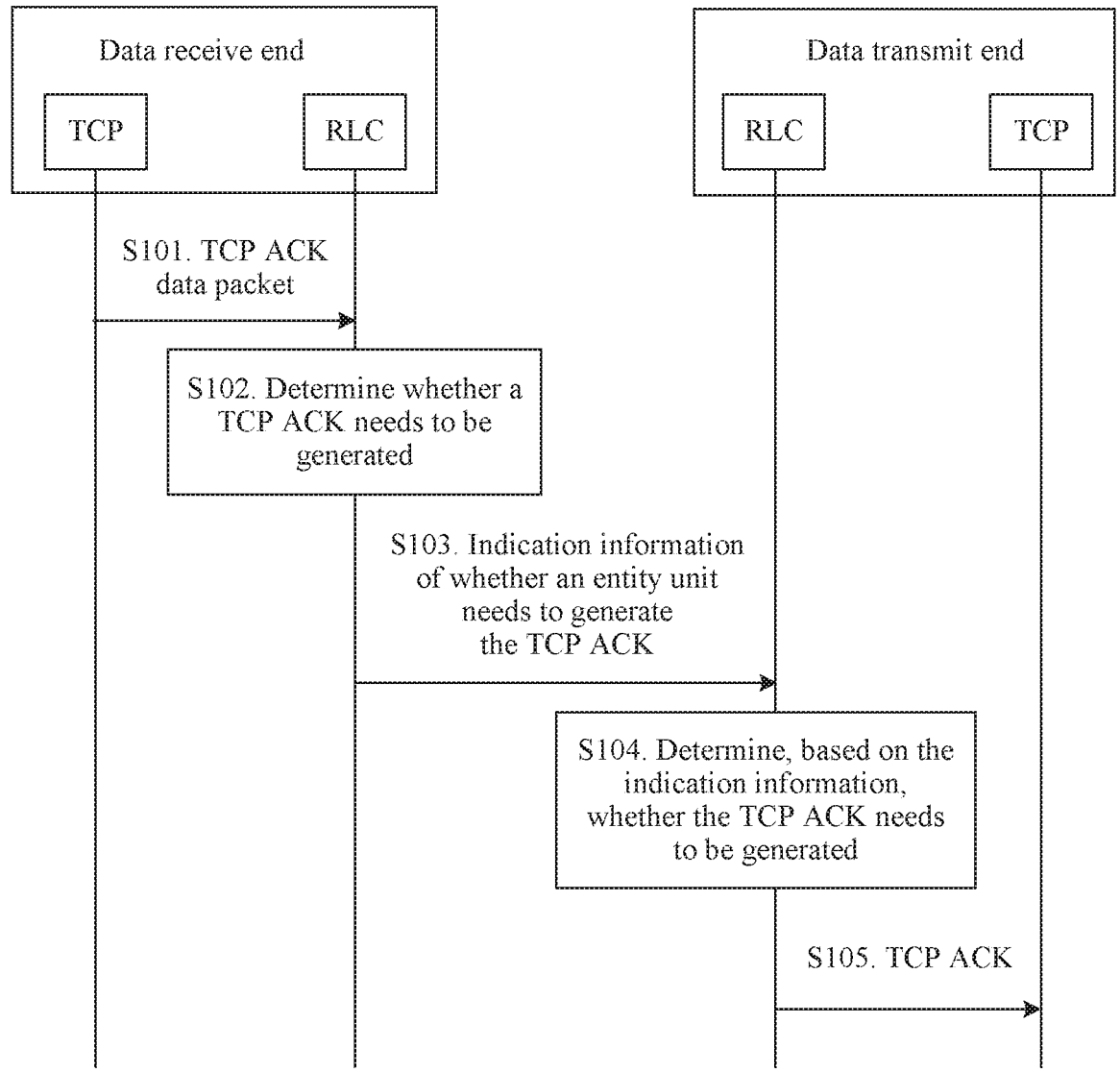
FIG. 4 is a schematic flowchart of a data transmission method according to an embodiment of the present disclosure.

FIG. 4 is a schematic flowchart of a data transmission method according to an embodiment of the present disclosure. As shown in FIG. 4, the data transmission method includes the following steps.

S101. When determining that a TCP data packet is correctly received, a TCP protocol entity unit of a data receive end sends a TCP ACK, and an RLC protocol entity unit of the data receive end receives the TCP ACK sent by the TCP protocol entity unit of the data receive end.

It should be noted that, in this embodiment of the present disclosure, an example in which the RLC protocol entity unit of the data receive end receives the TCP ACK sent by the TCP protocol entity unit of the data receive end is used for description. In an actual data transmission process, a PDCP or MAC protocol entity unit may receive the TCP ACK sent by the TCP protocol entity unit of the data receive end.

S102. The RLC protocol entity unit of the data receive end determines whether an RLC protocol entity unit of a data transmit end needs to generate a TCP ACK.

In this embodiment of the present disclosure, the RLC protocol entity unit of the data receive end may determine, based on content of the TCP ACK generated by the TCP protocol entity unit of the data receive end, whether the TCP ACK needs to be generated. For example, if the TCP ACK includes data content, a header of the TCP ACK includes indication information used to indicate that the TCP ACK is a synchronization data packet (an SYN bit is set to 1, and an ACK bit is set to 1), the header of the TCP ACK includes indication information used to indicate that the TCP ACK is a finish data packet (a FIN bit is set to 1, and an ACK bit is set to 1), the header of the TCP ACK includes window size information, or a TCP option in the header of the TCP ACK includes at least one of the following options, such as multipath TCP information, selective acknowledgement information (SACK), a selective acknowledgement permitted (SACK permitted) option, or time stamp information, the RLC protocol entity unit of the data receive end determines that the RLC protocol entity unit of the data transmit end does not need to generate the TCP ACK, and generates indication information indicating that the RLC protocol entity unit of the data transmit end does not need to generate the TCP ACK. If the TCP ACK does not include data content, a header of the TCP ACK does not include indication information used to indicate that the TCP ACK is a synchronization (SYN) packet (an SYN bit is set to 0, and an ACK bit is set to 1), the header of the TCP ACK does not include indication information used to indicate that the TCP ACK is a finish data packet (a FIN bit is set to 0, and an ACK bit is set to 1), the header of the TCP ACK does not include window size information, and a TCP option in the header of the TCP ACK does not include multipath TCP information, SACK information, SACK permitted, or time stamp information, the RLC protocol entity unit of the data receive end determines that the RLC protocol entity unit of the data transmit end needs to generate the TCP ACK, and generates indication information indicating that the RLC protocol entity unit of the data transmit end needs to generate the TCP ACK.

Optionally, the TCP protocol entity unit of the data receive end usually generates the TCP ACK after receiving two TCP data packets. Therefore, in this embodiment of the present disclosure, the RLC protocol entity unit of the data receive end may also determine, based on a frequency the same as a frequency at which the TCP protocol entity unit of the data receive end generates the TCP ACK, whether the RLC protocol entity unit of the data transmit end needs to generate the TCP ACK.

S103. The RLC protocol entity unit of the data receive end generates indication information indicating whether the RLC protocol entity unit of the data transmit end needs to generate the TCP ACK, and sends the indication information to the RLC protocol entity unit of the data transmit end.

In this embodiment of the present disclosure, the RLC protocol entity unit of the data receive end may send the indication information by using an RLC control protocol data unit (PDU) or an MAC control element (CE).

Optionally, in this embodiment of the present disclosure, when the indication information is sent by using an RLC PDU, a newly-defined RLC control PDU may be used to indicate that the RLC protocol entity unit of the data transmit end needs to generate the TCP ACK. For example, a CPT field value of the RLC control PDU may be set to 001, to indicate that the RLC control PDU is used to indicate that the RLC protocol entity unit of the data transmit end needs to generate the TCP ACK. Optionally, the indication information may further indicate a TCP acknowledgement number of a TCP ACK that needs to be generated by the RLC protocol entity unit of the transmit end. There are the following two manners:

In a first manner, the indication information includes a sequence number of the RLC PDU. It should be noted that the data receive end also needs to maintain a mapping relationship between an RLC PDU and a TCP acknowledgement number. For example, the data receive end may read a start fragment corresponding to each RLC SDU or a TCP acknowledgement number included in an RLC PDU corresponding to a non-fragmented RLC SDU, to establish the mapping relationship. When the TCP ACK from the data receive end is received, a TCP acknowledgement number in the TCP ACK is obtained, and a sequence number of a last RLC PDU of an RLC SDU corresponding to a TCP acknowledgement number that is previous to the TCP acknowledgement number is determined by looking up the mapping relationship.

In a second manner, the indication information includes a TCP acknowledgement number in the TCP ACK. Alternatively, when a TCP link is multiflow TCP link, the indication information may include a port number and a TCP acknowledgement number in the TCP ACK.

In the first manner, before the indication information is sent, if the RLC protocol entity unit of the data receive end does not finish RLC acknowledgement of the RLC PDU, the indication information may be further used to notify the RLC protocol entity unit of the data transmit end that the RLC PDU is correctly received, so that the RLC protocol entity unit of the data transmit end can perform a corresponding sliding window processing operation on an RLC layer.

Optionally, if the RLC protocol entity unit of the data receive end determines that the RLC protocol entity unit of the data transmit end does not need to generate the TCP ACK, the RLC protocol entity unit of the data receive end sends the indication information by using an RLC data PDU. The RLC data PDU carries content of the TCP ACK.

Optionally, if the RLC protocol entity unit of the data receive end determines that the RLC protocol entity unit of the data transmit end does not need to generate the TCP ACK, the RLC protocol entity unit of the data receive end sets a CPT field value of an RLC control PDU to 002, to indicate that the RLC protocol entity unit of the data transmit end does not need to generate the TCP ACK. It should be noted that the foregoing merely uses the CPT field as an example for description and a threshold of a field other than the CPT field may be alternatively set.

Optionally, the data receive end may send, to an MAC protocol entity unit of the data transmit end by using the MAC control element (MAC CE), a result of whether the RLC protocol entity unit of the data transmit end needs to generate the TCP ACK.

S104. The RLC protocol entity unit of the data transmit end receives the indication information sent by the RLC protocol entity unit of the data receive end, and determines whether the TCP ACK needs to be generated.

S105. The RLC protocol entity unit of the data transmit end sends the TCP ACK to a TCP protocol entity unit of the data transmit end based on the indication information.

In this embodiment of the present disclosure, if the RLC protocol entity unit of the data transmit end determines, based on the indication information, that the TCP ACK needs to be generated, the RLC protocol entity unit of the data transmit end generates the TCP ACK based on the indication information, and sends the generated TCP ACK to the TCP protocol entity unit of the data transmit end.

Optionally, in this embodiment of the present disclosure, if the indication information is used to indicate that the RLC protocol entity unit of the data transmit end needs to generate the TCP ACK, the indication information further includes indication information used to determine an acknowledgement number of the TCP ACK that needs to be generated by the RLC protocol entity unit of the data transmit end.

In this embodiment of the present disclosure, the indication information used to determine the acknowledgement number of the TCP ACK that needs to be generated by the RLC protocol entity unit of the data transmit end may be a sequence number that is of an ACK of an RLC PDU and that is sent by the RLC protocol entity unit of the data receive end to the RLC protocol entity unit of the data transmit end. The sequence number of the ACK of the RLC PDU is an ACK_SN of the RLC PDU. The RLC protocol entity unit of the data transmit end maintains a mapping relationship between a TCP sequence number and a sequence number of an RLC PDU. Certainly, if a plurality of TCP data flows are included, a mapping relationship between (a TCP sequence number and a port number) and a sequence number of an RLC PDU may be maintained. Therefore, when the RLC protocol entity unit of the data transmit end receives the indication information used to indicate the sequence number of the ACK of the RLC PDU, the acknowledgement number of the TCP ACK that needs to be generated can be determined, and the TCP ACK can be generated based on the acknowledgement number that is of the TCP ACK and that is included in the indication information.

Optionally, in this embodiment of the present disclosure, the indication information used to determine a sequence number of the TCP ACK that needs to be generated by the RLC protocol entity unit of the data transmit end may also be the acknowledgement number of the TCP ACK that needs to be generated.

Optionally, before the RLC protocol entity unit of the data receive end sends the indication information to the RLC protocol entity unit of the data transmit end, if the RLC protocol entity unit of the data receive end does not finish sending the sequence number of the ACK of the RLC PDU to the RLC protocol entity unit of the data transmit end, the indication information is further used to indicate that the RLC PDU is correctly received. After the RLC protocol entity unit of the data transmit end receives the indication information sent by the RLC protocol entity unit of the data receive end, the RLC protocol entity unit of the data transmit end may acknowledge, based on the indication information, that the RLC protocol data packet is correctly received.

In this embodiment of the present disclosure, if the RLC protocol entity unit of the data transmit end determines, based on the indication information, that the TCP ACK does not need to be generated, the RLC protocol entity unit of the data transmit end may directly send the TCP ACK to the TCP protocol entity unit of the data transmit end based on the RLC PDU that is sent by the RLC protocol entity unit of the data receive end and that carries the TCP ACK.

For the foregoing technical problem (1), an embodiment of the present disclosure provides another data transmission method. According to the method, a TCP protocol entity unit of a data transmit end has a capability of processing two TCP ACKs with a same acknowledgement number. To be specific, the TCP protocol entity unit of the data transmit end can process a TCP ACK that is generated by an RLC protocol entity unit of the data transmit end for a TCP data packet and a TCP ACK that is generated by a TCP protocol entity unit of a data receive end for the same TCP data packet. The TCP protocol entity unit of the data transmit end, the RLC protocol entity unit of the data transmit end, an RLC protocol entity unit of the data receive end, and the TCP protocol entity unit of the data receive end perform capability negotiation with each other. When the TCP protocol entity unit of the data transmit end has the capability of processing the two TCP ACKs with the same acknowledgement number, a method for identifying the TCP ACK generated by the RLC protocol entity unit of the data transmit end may be used, so that the TCP protocol entity unit of the data transmit end can distinguish between the TCP ACK generated by the RLC protocol entity unit of the data transmit end and the TCP ACK generated by the TCP protocol entity unit of the data receive end, and perform processing.

Figure 5:
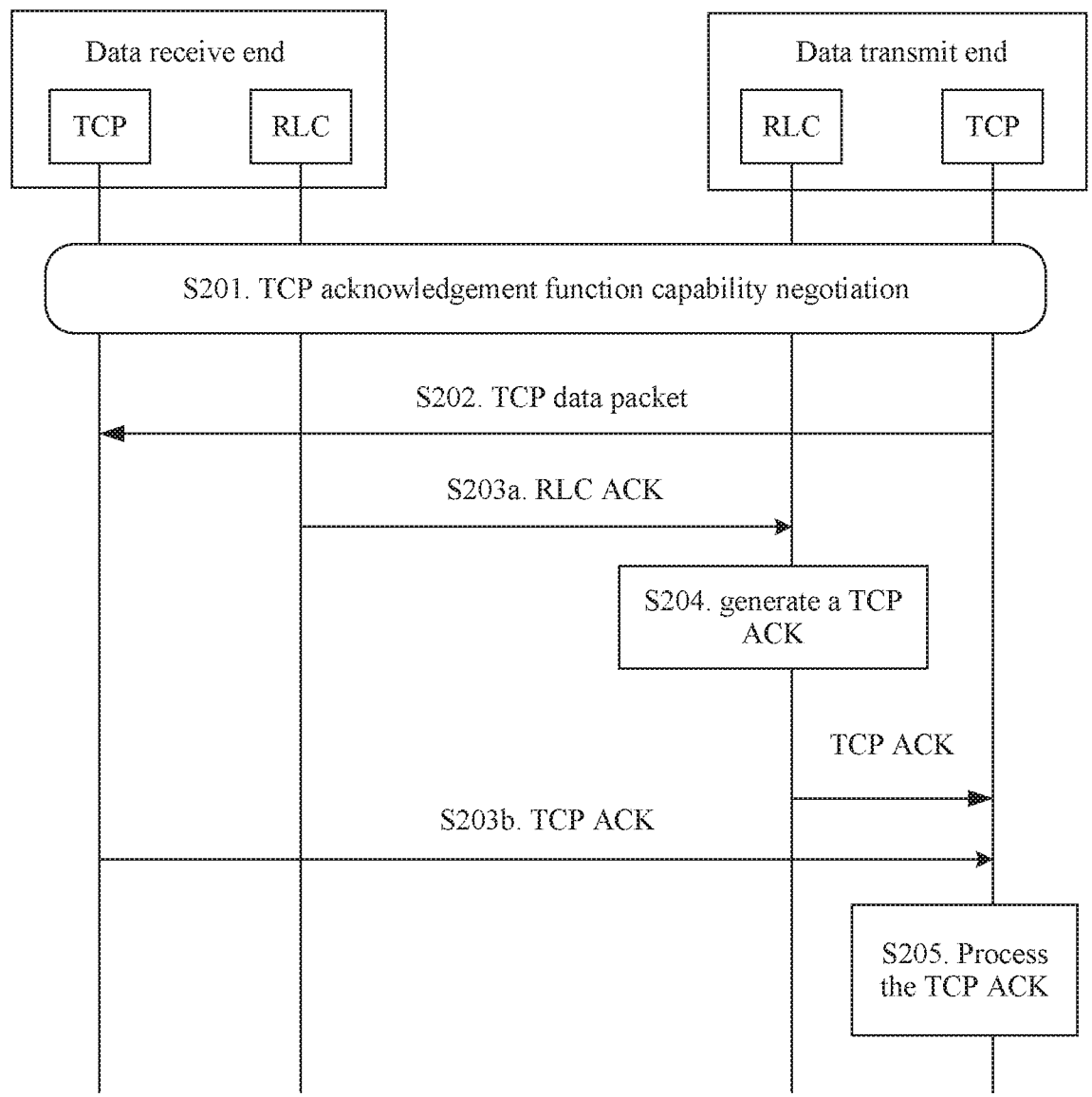
FIG. 5 is a flowchart of another data transmission method according to an embodiment of the present disclosure.

FIG. 5 is a flowchart of another data transmission method according to an embodiment of the present disclosure. As shown in FIG. 5, the data transmission method includes the following steps.

S201. A TCP protocol entity unit of a data transmit end, an RLC protocol entity unit of the data transmit end, an RLC protocol entity unit of a data receive end, and a TCP protocol entity unit of the data receive end perform TCP acknowledgement function capability negotiation with each other.

In this embodiment of the present disclosure, for ease of description, a capability of supporting processing of two TCP ACKs with a same acknowledgement number is referred to as a TCP acknowledgement function capability. The capability includes that the TCP protocol entity unit of the data transmit end supports processing of TCP ACKs with a same TCP acknowledgement number.

In a possible implementation, the TCP protocol entity unit of the data transmit end, the RLC protocol entity unit of the data transmit end, the RLC protocol entity unit of the data receive end, and the TCP protocol entity unit of the data receive end perform TCP acknowledgement function capability negotiation with each other in the following manner: The TCP protocol entity unit of the data transmit end sends the capability of supporting processing of the two TCP ACKs with the same acknowledgement number to the RLC protocol entity unit of the data transmit end. The RLC protocol entity unit of the data transmit end and the TCP protocol entity unit of the data transmit end perform TCP acknowledgement function capability negotiation with each other. The RLC protocol entity unit of the data transmit end and the RLC protocol entity unit of the data receive end perform TCP acknowledgement function capability negotiation with each other. The RLC protocol entity unit of the data receive end and the TCP protocol entity unit of the data transmit end need to perform TCP acknowledgement function capability negotiation with each other.

It should be noted that, in this embodiment of the present disclosure, the TCP acknowledgement function capability negotiation performed between the RLC protocol entity unit of the data transmit end and the RLC protocol entity unit of the data receive end is capability negotiation between nodes on which the RLC protocol entity units are located. For example, in a downlink data sending process, a node on which the TCP protocol entity unit of the data transmit end is located is a TCP server, and a node on which the RLC protocol entity unit of the data transmit end is located is an RAN.

In another possible implementation, in this embodiment of the present disclosure, the TCP protocol entity unit of the data transmit end, the RLC protocol entity unit of the data transmit end, the RLC protocol entity unit of the data receive end, and the TCP protocol entity unit of the data receive end may further perform TCP acknowledgement function capability negotiation with each other in the following manner:

The TCP protocol entity unit of the data transmit end and the TCP protocol entity unit of the data receive end perform TCP acknowledgement function capability negotiation with each other. The TCP protocol entity unit of the data transmit end notifies the RLC protocol entity unit of the data transmit end of a result of the capability negotiation. The RLC protocol entity unit of the transmit end and the RLC protocol entity unit of the receive end further perform TCP acknowledgement function capability negotiation, determine whether to enable a TCP ACK reduction function, and notify the TCP protocol entity unit of the transmit end of the result.

S202. The TCP protocol entity unit of the data transmit end sends a TCP data packet.

S203a. The RLC protocol entity unit of the data receive end receives the TCP data packet, and sends an RLC ACK to the RLC protocol entity unit of the data transmit end.

S203b. The TCP protocol entity unit of the data receive end receives the TCP data packet, and sends a TCP ACK to the TCP protocol entity unit of the data transmit end.

S204. The RLC protocol entity unit of the data transmit end generates a TCP ACK, and sends the generated TCP ACK.

It should be noted that the accompanying drawings in the embodiments of the present disclosure are merely examples for description and a time sequence for performing the steps in the accompanying drawings is not limited. For example, in FIG. 5, there is no time sequence between step S203b of sending a TCP ACK by the TCP protocol entity unit of the data receive end and step S204 of sending the generated TCP ACK by the RLC protocol entity unit of the data transmit end.

In this embodiment of the present disclosure, the generated TCP ACK includes identification information used to indicate that the TCP ACK is the generated TCP ACK. The RLC protocol entity unit of the data transmit end sends the identifier information to the TCP protocol entity unit of the data transmit end, so that the TCP protocol entity unit of the data transmit end can distinguish whether the received TCP ACK is the TCP ACK generated by the RLC protocol entity unit or the TCP ACK generated by the TCP protocol entity unit of the data receive end.

In this embodiment of the present disclosure, a specific field identifier in a header of the generated TCP ACK may be used to indicate that the TCP ACK is the generated TCP ACK.

S205. The TCP protocol entity unit of the data transmit end obtains the TCP ACKs with a same TCP acknowledgement number and performs processing.

In this embodiment of the present disclosure, the TCP protocol entity unit of the data transmit end may process, based on a time sequence for receiving the TCP ACKs, the TCP ACK generated by the RLC protocol entity unit and the TCP ACK generated by the TCP protocol entity unit of the data receive end.

In this embodiment of the present disclosure, if a time when the TCP protocol entity unit of the data transmit end obtains the TCP ACK generated by the RLC protocol entity unit is earlier than a time when the TCP protocol entity unit of the data transmit end obtains the TCP ACK generated by the TCP protocol entity unit of the data receive end, the data transmit end determines, based on the TCP ACK generated by the RLC protocol entity unit, that the data packet with the TCP acknowledgement number is correctly received, and processes data content information included in the TCP ACK generated by the TCP protocol entity unit of the data receive end.

If a time when the data transmit end obtains the TCP ACK generated by the RLC protocol entity unit is later than a time when the data transmit end obtains the TCP ACK generated by the TCP protocol entity unit of the data receive end, the data transmit end determines, based on the TCP ACK generated by the TCP protocol entity unit of the data receive end, that the data packet with the TCP acknowledgement number is correctly received, processes data content information included in the TCP ACK generated by the TCP protocol entity unit of the data receive end, and discards the TCP ACK generated by the RLC protocol entity unit.

For the foregoing technical problem (2), in this embodiment of the present disclosure, on a basis that the TCP protocol entity unit of the data transmit end has the capability of processing the two TCP ACKs with the same acknowledgement number, the RLC protocol entity unit of the data transmit end further needs to have a capability of TCP data transmission acknowledgement on a wired network side, for example, ensuring that accurate TCP/IP packets reach the data transmit end in order. For example, the RLC protocol entity unit of the data transmit end needs to perform integrity check on each arrival TCP/IP packet, read a TCP acknowledgement number of each arrival TCP/IP packet, and record a sequence number of a TCP data packet that is correctly received.

In this embodiment of the present disclosure, an implementation procedure of a data transmission method used for the technical problem (2) is similar to an implementation procedure of the method that is used for the technical problem (1) and shown in FIG. 5. A difference merely lies in: On a basis of TCP acknowledgement function capability negotiation shown in FIG. 5, the TCP protocol entity unit of the data transmit end and the RLC protocol entity unit of the data transmit end further need to perform TCP data transmission acknowledgement capability negotiation on the wired network side. For other same steps, refer to FIG. 5, and details are not described herein again.

For the foregoing technical problem (3), an embodiment of the present disclosure provides still another data transmission method. According to the transmission method, a trigger mechanism for triggering an RLC protocol entity unit to send an RLC ACK is changed. According to the method, an RLC protocol entity unit of a data transmit end may add a poll indication to a last fragment (namely, a last RLC PDU) of an RLC SDU that is sent to an RLC protocol entity unit of a data receive end, to trigger the RLC protocol entity unit of the data receive end to send an RLC ACK. The method can ensure that the RLC protocol entity unit of the data transmit end can receive the RLC ACK as soon as possible and further generate a TCP ACK as soon as possible.

Optionally, in this embodiment of the present disclosure, when triggering the RLC ACK, the receive end may not be limited by a status prohibit mechanism. In other words, regardless of whether a status prohibit timer runs, the data receive end immediately returns the RLC ACK, provided that the poll indication is received. In this way, the RLC protocol entity unit of the data receive end sends the RLC ACK in a timelier manner, ensuring that the RLC protocol entity unit of the data transmit end can receive the RLC ACK as soon as possible and further generate the TCP ACK as soon as possible.

The foregoing mainly describes, from a perspective of interaction between the data receive end and the data transmit end, the solutions provided in the embodiments of the present disclosure. It may be understood that, to implement the foregoing functions, the data receive end and the data transmit end include corresponding hardware structures and/or software modules for performing the functions. With reference to units and algorithm steps in the examples described in the embodiments disclosed in the present disclosure, the embodiments of the present disclosure can be implemented in a form of hardware or in a form of a combination of hardware and computer software. Whether a function is performed by hardware or hardware driven by computer software depends on particular applications and design constraints of the technical solutions. For the particular applications, a person skilled in the art may use different methods to implement the described functions, but it should not be considered that the implementation goes beyond the scope of the technical solutions in the embodiments of the present disclosure.

In the embodiments of the present disclosure, functional unit division may be performed on the data receive end and the data transmit end according to the foregoing method examples. For example, functional units may be divided based on corresponding functions, or at least two functions may be integrated into one processing unit. The integrated unit may be implemented in a form of hardware, or may be implemented in a form of a software functional unit. It should be noted that, in the embodiments of the present disclosure, the unit division is an example and is merely logical function division. During actual implementation, there may be other division manners.

Figure 6:
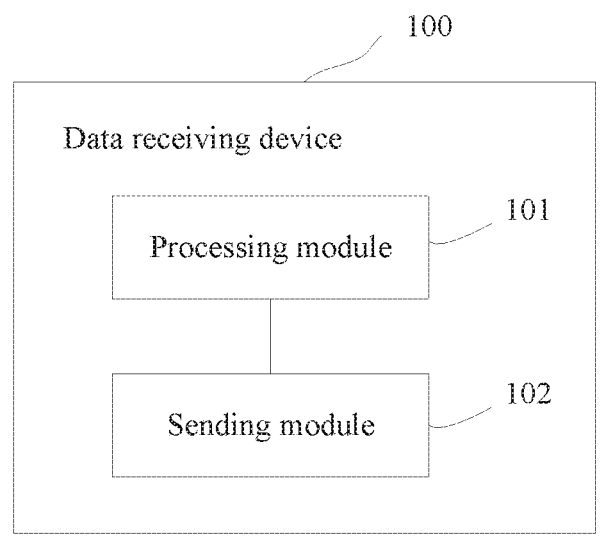
FIG. 6 is a schematic structural diagram of a data receiving device according to an embodiment of the present disclosure.

When an integrated unit is used, FIG. 6 is a schematic structural diagram of a possible data receiving device 100. The data receiving device 100 may include a processing module 101 and a sending module 102. The processing module 101 is configured to determine whether an RLC protocol entity unit of the data receiving device receives a TCP acknowledgement sent by a TCP protocol entity unit of the data receiving device. The sending module 102 is configured to: when the processing module 101 determines that the RLC protocol entity unit of the data receiving device receives the TCP acknowledgement sent by the TCP protocol entity unit of the data receiving device, send indication information to an RLC protocol entity unit of a data transmit end, where the indication information is used to indicate whether the RLC protocol entity unit of the data transmit end needs to generate a TCP acknowledgement.

The processing module 101 is further configured to: before the sending module 102 sends the indication information to the RLC protocol entity unit of the data transmit end, determine whether the RLC protocol entity unit of the data transmit end needs to generate the TCP acknowledgement, and generate the indication information indicating whether the RLC protocol entity unit of the data transmit end needs to generate the TCP acknowledgement; and if the TCP acknowledgement includes data content, a header of the TCP acknowledgement includes indication information used to indicate that the TCP acknowledgement is a synchronization data packet, the header of the TCP acknowledgement includes indication information used to indicate that the TCP acknowledgement is a finish data packet, the header of the TCP acknowledgement includes window size information, or a TCP option in the header of the TCP acknowledgement includes at least one of multipath TCP information, selective acknowledgement information, a selective acknowledgement permitted option, or time stamp information, determine that the RLC protocol entity unit of the data transmit end does not need to generate the TCP acknowledgement, and generate indication information indicating that the RLC protocol entity unit of the data transmit end does not need to generate the TCP acknowledgement; or if the TCP acknowledgement does not include data content, a header of the TCP acknowledgement does not include indication information used to indicate that the TCP acknowledgement is a synchronization (SYN) packet, the header of the TCP acknowledgement does not include indication information used to indicate that the TCP acknowledgement is a finish data packet, the header of the TCP acknowledgement does not include window size information, and a TCP option in the header of the TCP acknowledgement does not include multipath TCP information, selective acknowledgement information, a selective acknowledgement permitted option, or time stamp information, determine that the RLC protocol entity unit of the data transmit end needs to generate the TCP acknowledgement, and generate indication information indicating that the RLC protocol entity unit of the data transmit end needs to generate the TCP acknowledgement.

The sending module 102 may send the indication information by using an RLC control protocol data unit or an MAC control element.

Optionally, if the indication information is used to indicate that the RLC protocol entity unit of the data transmit end needs to generate the TCP acknowledgement, the indication information further includes indication information used to determine an acknowledgement number of the TCP acknowledgement that needs to be generated by the RLC protocol entity unit of the data transmit end.

The indication information used to determine the acknowledgement number of the TCP acknowledgement that needs to be generated by the RLC protocol entity unit of the data transmit end may be a sequence number that is of an acknowledgement of an RLC protocol data unit (PDU) and that is sent by the RLC protocol entity unit of the data receiving device to the RLC protocol entity unit of the data transmit end.

Optionally, before the sending module 102 sends the indication information to the RLC protocol entity unit of the data transmit end, if the sending module 102 does not finish sending the sequence number of the acknowledgement of the RLC PDU to the RLC protocol entity unit of the data transmit end, the indication information is further used to indicate that the RLC PDU is correctly received.

If the RLC protocol entity unit of the data transmit end does not need to generate the TCP acknowledgement, the sending module 102 may send the indication information by using an RLC data PDU, where the RLC data PDU carries content of the TCP acknowledgement.

It may be understood that the processing module 101 and the sending module 102 in this embodiment of the present disclosure may be understood as divided function modules in an RLC protocol entity unit of the receiving device.

In this embodiment of the present disclosure, when hardware is used for implementation, the processing module 101 may be a processor or a controller, and the sending module 102 may be a communications interface, a transceiver, a transceiver circuit, or the like. The communications interface is a collective term and may include one or more interfaces.

Figure 7:
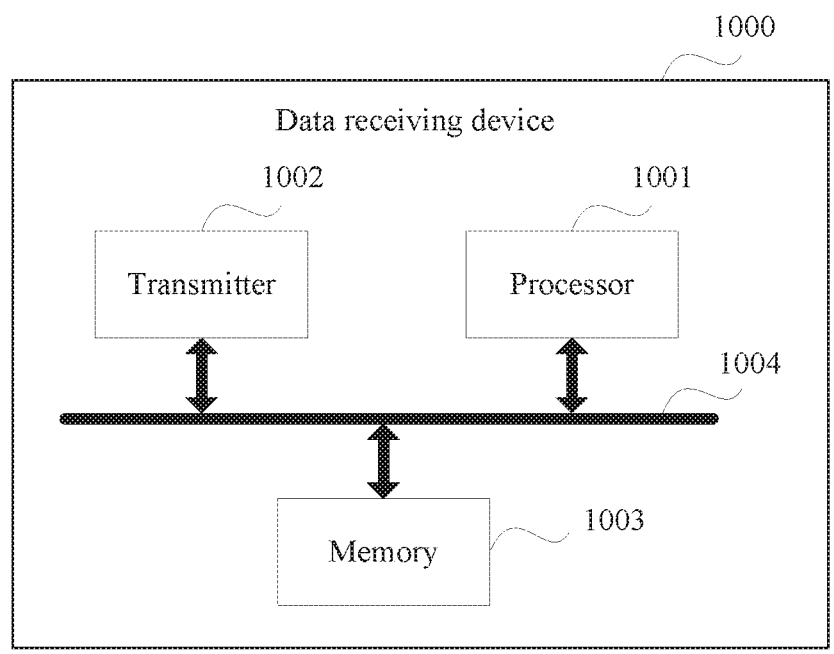
FIG. 7 is another schematic structural diagram of a data receiving device according to an embodiment of the present disclosure.

When the processing module 101 is a processor and the sending module 102 is a transmitter, the data receiving device 100 provided in this embodiment of the present disclosure may be a data receiving device shown in FIG. 7. The data receiving device shown in FIG. 7 may be a terminal.

FIG. 7 is a schematic structural diagram of a possible data receiving device 1000 according to an embodiment of the present disclosure. To be specific, FIG. 7 shows another possible data receiving device according to this embodiment of the present disclosure. As shown in FIG. 7, the data receiving device 1000 includes a processor 1001 and a transmitter 1002. Alternatively, the processor 1001 may be a controller. The transmitter 1002 is configured to support sending and receiving of information between the data receiving device 1000 and all protocol entity units of the data transmit end provided in the foregoing embodiment. The processor 1001 is configured to support the data receiving device 1000 in implementing execution functions of all protocol entity units of the data receive end provided in the foregoing embodiment.

The processor 1001 is configured to determine whether a Radio Link Control (RLC) protocol entity unit of the data receiving device receives a Transmission Control Protocol (TCP) acknowledgement sent by a TCP protocol entity unit of the data receiving device. The transmitter 1002 is configured to: when the processor 1001 determines that the RLC protocol entity unit of the data receiving device receives the TCP acknowledgement sent by the TCP protocol entity unit of the data receiving device, send indication information to an RLC protocol entity unit of the data transmit end, where the indication information is used to indicate whether the RLC protocol entity unit of the data transmit end needs to generate a TCP acknowledgement.

The processor 1001 is further configured to: before the transmitter 1002 sends the indication information to the RLC protocol entity unit of the data transmit end, determine whether the RLC protocol entity unit of the data transmit end needs to generate the TCP acknowledgement, and generate the indication information indicating whether the RLC protocol entity unit of the data transmit end needs to generate the TCP acknowledgement; and if the TCP acknowledgement includes data content, a header of the TCP acknowledgement includes indication information used to indicate that the TCP acknowledgement is a synchronization data packet, the header of the TCP acknowledgement includes indication information used to indicate that the TCP acknowledgement is a finish data packet, the header of the TCP acknowledgement includes window size information, or a TCP option in the header of the TCP acknowledgement includes at least one of multipath TCP information, selective acknowledgement information, a selective acknowledgement permitted option, or time stamp information, determine that the RLC protocol entity unit of the data transmit end does not need to generate the TCP acknowledgement, and generate indication information indicating that the RLC protocol entity unit of the data transmit end does not need to generate the TCP acknowledgement; or if the TCP acknowledgement does not include data content, a header of the TCP acknowledgement does not include indication information used to indicate that the TCP acknowledgement is a synchronization (SYN) packet, the header of the TCP acknowledgement does not include indication information used to indicate that the TCP acknowledgement is a finish data packet, the header of the TCP acknowledgement does not include window size information, and a TCP option in the header of the TCP acknowledgement does not include multipath TCP information, selective acknowledgement information, a selective acknowledgement permitted option, or time stamp information, determine that the RLC protocol entity unit of the data transmit end needs to generate the TCP acknowledgement, and generate indication information indicating that the RLC protocol entity unit of the data transmit end needs to generate the TCP acknowledgement.

The transmitter 1002 sends the indication information to the RLC protocol entity unit of the data transmit end in the following manner: sending the indication information by using an RLC control protocol data unit or an MAC control element.

If the indication information is used to indicate that the RLC protocol entity unit of the data transmit end needs to generate the TCP acknowledgement, the indication information further includes indication information used to determine an acknowledgement number of the TCP acknowledgement that needs to be generated by the RLC protocol entity unit of the data transmit end.

The indication information used to determine the acknowledgement number of the TCP acknowledgement that needs to be generated by the RLC protocol entity unit of the data transmit end is a sequence number that is of an acknowledgement of an RLC protocol data unit (PDU) and that is sent by the RLC protocol entity unit of the data receiving device to the RLC protocol entity unit of the data transmit end.

Before the transmitter 1002 sends the indication information to the RLC protocol entity unit of the data transmit end, if the transmitter 1002 does not finish sending the sequence number of the acknowledgement of the RLC PDU to the RLC protocol entity unit of the data transmit end, the indication information is further used to indicate that the RLC PDU is correctly received.

The transmitter 1002 sends the indication information to the RLC protocol entity unit of the data transmit end in the following manner: if the RLC protocol entity unit of the data transmit end does not need to generate the TCP acknowledgement, sending the indication information by using an RLC data PDU, where the RLC data PDU carries content of the TCP acknowledgement.

The data receiving device 1000 may further include a memory 1003 and a bus 1004. The memory 1003 is configured to: be coupled to the processor 1001, and store program code and data of the data receiving device 1000. The transmitter 1002, the processor 1001, and the memory 1003 may be connected to each other by using the bus 1004. For ease of representation, only one bold line is used to represent the bus 1004 in FIG. 7, but this does not mean that there is only one bus or only one type of bus.

It may be understood that FIG. 7 shows merely a simplified design of the data receiving device 1000. In actual application, the data receiving device 1000 is not limited to the foregoing structure. For example, the data receiving device 1000 may further include a display device, an input/output interface, and the like. All terminals that can implement this embodiment of the present disclosure shall fall within the protection scope of the embodiments of the present disclosure.

It may be further understood that the data receiving device 100 and the data receiving device 1000 that are provided in this embodiment of the present disclosure may be configured to implement corresponding functions of all protocol entity units of the data receive end in the foregoing method embodiments of the embodiments of the present disclosure. Therefore, for a part that is not described in detail in this embodiment of the present disclosure, refer to related descriptions in the method embodiments. Details are not described again in this embodiment of the present disclosure.

Figure 8:
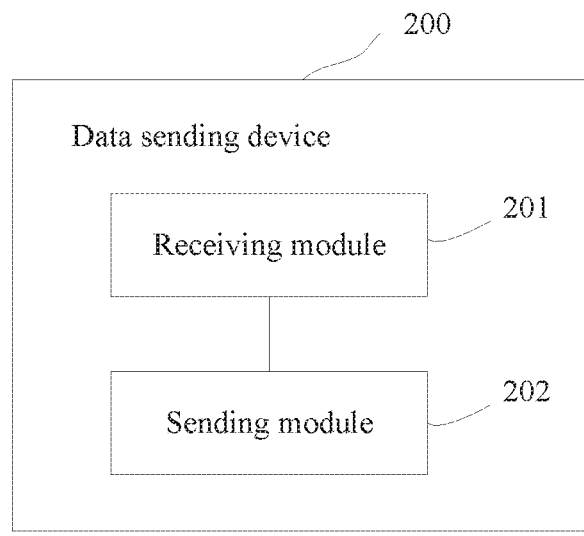
FIG. 8 is a schematic structural diagram of a data sending device according to an embodiment of the present disclosure.

When an integrated unit is used, FIG. 8 shows a possible structure of a data sending device 200. The data sending device 200 may include a receiving module 201 and a sending module 202. The receiving module 201 is configured to receive indication information sent by an RLC protocol entity unit of a data receive end, where the indication information is used to indicate whether an RLC protocol entity unit of the data sending device needs to generate a TCP acknowledgement. The sending module 202 is configured to send a TCP acknowledgement to a TCP protocol entity unit of the data sending device based on the indication information received by the receiving module 201.

Figure 9:
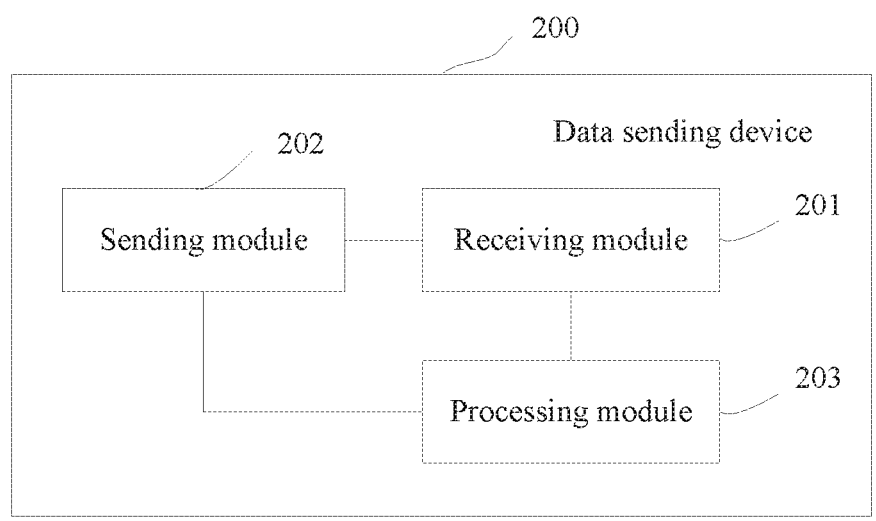
FIG. 9 is another schematic structural diagram of a data sending device according to an embodiment of the present disclosure.

Optionally, the data sending device further includes a processing module 203, as shown in FIG. 9. The processing module 203 is configured to generate the TCP acknowledgement based on the indication information. The sending module 202 is further configured to send the generated TCP acknowledgement to the TCP protocol entity unit of the data sending device.

Optionally, the sending module 202 is configured to: before the receiving module 201 receives the indication information sent by the RLC protocol entity unit of the data receive end, send an RLC protocol data unit (PDU) to the RLC protocol entity unit of the data receive end. The data sending device further includes a processing module 203, configured to: when the RLC PDU is a last fragment of an RLC service data unit (SDU), add a poll indication to the RLC PDU, and trigger the RLC protocol entity unit of the data receive end to send an RLC acknowledgement.

The processing module 203 generates the TCP acknowledgement based on the indication information in the following manner: generating the TCP acknowledgement based on indication information that is included in the indication information and that is used to determine an acknowledgement number of the TCP acknowledgement that needs to be generated by the RLC protocol entity unit of the data sending device.

The processing module 203 generates the TCP acknowledgement in the following manner based on the indication information that is included in the indication information and that is used to determine the acknowledgement number of the TCP acknowledgement that needs to be generated by the RLC protocol entity unit of the data sending device: determining, based on a sequence number that is of an acknowledgement of an RLC protocol data unit (PDU) and that is included in the indication information, the acknowledgement number of the TCP acknowledgement that needs to be generated, where the RLC PDU is sent by the RLC protocol entity unit of the data receive end to the RLC protocol entity unit of the data sending device; and generating the TCP acknowledgement based on the acknowledgement number of the TCP acknowledgement.

Optionally, the processing module 203 is further configured to: after the receiving module 201 receives the indication information sent by the RLC protocol entity unit of the data receive end, if the RLC protocol entity unit of the data receive end does not finish sending the sequence number of the acknowledgement of the RLC PDU, acknowledge, based on the indication information, that the RLC PDU is correctly received.

In this embodiment of the present disclosure, when hardware is used for implementation, the processing module 203 may be a processor or a controller, the receiving module 201 may be a receiver, and the sending module 202 may be a transmitter.

Figure 10:
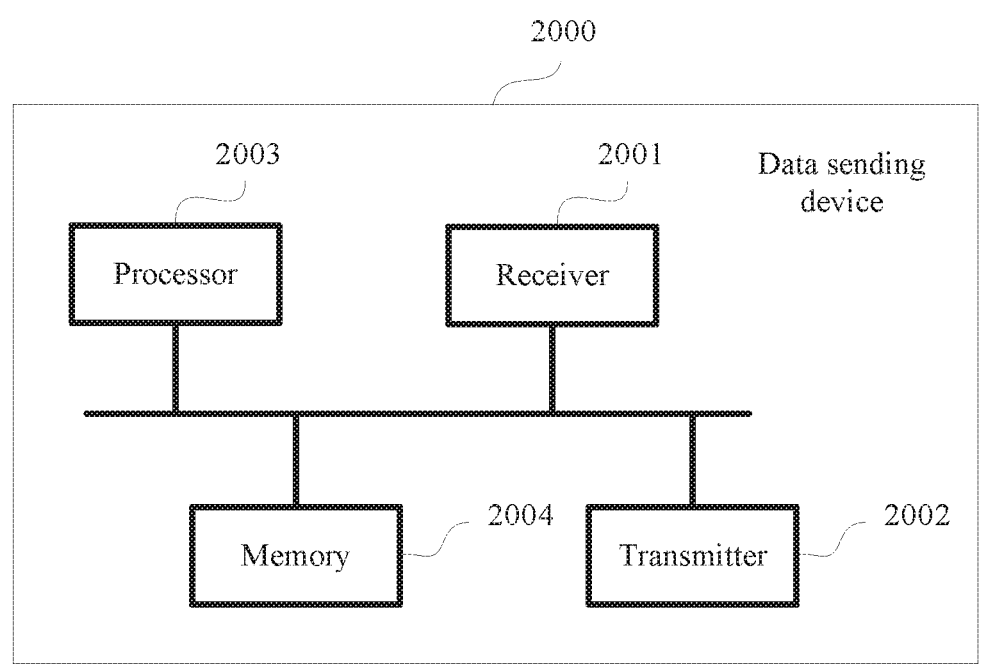
FIG. 10 is still another schematic structural diagram of a data sending device according to an embodiment of the present disclosure.

When the processing module 203 is a processor, the receiving module 201 is a receiver, and the sending module 202 is a transmitter, the data sending device 200 provided in this embodiment of the present disclosure may be a data sending device shown in FIG. 10. The data sending device shown in FIG. 10 may be an application server.

FIG. 10 is a schematic structural diagram of a possible data sending device 2000 according to an embodiment of the present disclosure. To be specific, FIG. 10 shows another possible data sending device according to this embodiment of the present disclosure. As shown in FIG. 10, the data sending device 2000 includes a receiver 2001 and a transmitter 2002.

The receiver 2001 is configured to receive indication information sent by an RLC protocol entity unit of a data receive end, where the indication information is used to indicate whether an RLC protocol entity unit of the data sending device needs to generate a TCP acknowledgement. The transmitter 2002 is configured to send a TCP acknowledgement to a TCP protocol entity unit of the data sending device based on the indication information received by the receiver 2001.

The data sending device further includes a processor 2003. The processor 2003 is configured to generate the TCP acknowledgement based on the indication information. The transmitter 2002 is further configured to send the generated TCP acknowledgement to the TCP protocol entity unit of the data sending device.

The transmitter 2002 is configured to: before the receiver 2001 receives the indication information sent by the RLC protocol entity unit of the data receive end, send an RLC protocol data unit (PDU) to the RLC protocol entity unit of the data receive end. The data sending device further includes a processor 2003, configured to: when the RLC PDU is a last fragment of an RLC service data unit (SDU), add a poll indication to the RLC PDU, and trigger the RLC protocol entity unit of the data receive end to send an RLC acknowledgement.

The processor 2003 generates the TCP acknowledgement based on the indication information in the following manner: generating the TCP acknowledgement based on indication information that is included in the indication information and that is used to determine an acknowledgement number of the TCP acknowledgement that needs to be generated by the RLC protocol entity unit of the data sending device.

The processor 2003 generates the TCP acknowledgement in the following manner based on the indication information that is included in the indication information and that is used to determine the acknowledgement number of the TCP acknowledgement that needs to be generated by the RLC protocol entity unit of the data sending device: determining, based on a sequence number that is of an acknowledgement of an RLC protocol data unit (PDU) and that is included in the indication information, the acknowledgement number of the TCP acknowledgement that needs to be generated, where the RLC PDU is sent by the RLC protocol entity unit of the data receive end to the RLC protocol entity unit of the data sending device; and generating the TCP acknowledgement based on the acknowledgement number of the TCP acknowledgement.

The processor 2003 is further configured to: after the receiver 2001 receives the indication information sent by the RLC protocol entity unit of the data receive end, if the RLC protocol entity unit of the data receive end does not finish sending the sequence number of the acknowledgement of the RLC PDU, acknowledge, based on the indication information, that the RLC PDU is correctly received.

The data sending device 2000 may further include a memory 2004. The memory 2004 is configured to: be coupled to the processor 2003, and store program code and data of the data sending device 2000.

It may be understood that FIG. 10 shows merely a simplified design of the data sending device 2000. In actual application, the data sending device 2000 is not limited to the foregoing structure. For example, the data sending device 2000 may further include a network adapter, a cache, and the like. All application servers that can implement this embodiment of the present disclosure shall fall within the protection scope of the embodiments of the present disclosure.

It may be further understood that the data sending device 200 and the data sending device 2000 that are provided in this embodiment of the present disclosure may be configured to implement corresponding functions of all protocol entity units of the data transmit end in the foregoing method embodiments of the embodiments of the present disclosure. Therefore, for a part that is not described in detail in this embodiment of the present disclosure, refer to related descriptions in the method embodiments. Details are not described again in this embodiment of the present disclosure.

It should be noted that the foregoing processor or controller used in the embodiments of the present disclosure may be a central processing unit (CPU), a general purpose processor, a digital signal processor (DSP), an application-specific integrated circuit (ASIC), a field programmable gate array (FPGA), another programmable logic device, a transistor logic device, a hardware component, or any combination thereof. The processor or controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The bus may be a peripheral component interconnect (PCI) bus, an extended industry standard architecture (EISA) bus, or the like. The bus may be classified into an address bus, a data bus, a control bus, and the like.

A person of ordinary skill in the art may understand that all or some of the steps in each of the foregoing methods of the embodiments may be implemented by a program instructing a processor. The program may be stored in a computer readable storage medium. The storage medium may be a non-transitory medium, such as a random access memory, read-only memory, a flash memory, a hard disk, a solid state drive, a magnetic tape, a floppy disk, an optical disc, or any combination thereof.

The present disclosure is described with reference to respective flowcharts and block diagrams of the methods and the devices in the embodiments of the present disclosure. It should be understood that computer program instructions may be used to implement each process and each block in the flowcharts and the block diagrams and a combination of a process and a block in the flowcharts and the block diagrams. These computer program instructions may be provided for a general purpose computer, a dedicated computer, an embedded processor, or a processor of another programmable data processing device to generate an MAChine, so that the instructions executed by the computer or the processor of the another programmable data processing device generate an apparatus for implementing a specific function in one or more processes in the flowcharts or in one or more blocks in the block diagrams.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
   receiving, by a radio link control (RLC) protocol entity unit of a data receive end, a transmission control protocol (TCP) acknowledgement from a TCP protocol entity unit of the data receive end;
   when the TCP acknowledgement comprises data content, a header of the TCP acknowledgement comprises indication information used to indicate that the TCP acknowledgement is a synchronization data packet, the header of the TCP acknowledgement comprises indication information used to indicate that the TCP acknowledgement is a finish data packet, the header of the TCP acknowledgement comprises window size information, or a TCP option in the header of the TCP acknowledgement comprises at least one of multipath TCP information, selective acknowledgement information, a selective acknowledgement permitted option, or time stamp information, determining that a RLC protocol entity unit of the data transmit end does not need to generate the TCP acknowledgement, and generating indication information indicating that the RLC protocol entity unit of the data transmit end does not need to generate the TCP acknowledgement; and
   sending, by the RLC protocol entity unit of the data receive end, indication information to an RLC protocol entity unit of a data transmit end.

2. The method according to claim 1, wherein before sending the indication information to the RLC protocol entity unit of the data transmit end, the method further comprises:
   determining whether the RLC protocol entity unit of the data transmit end needs to generate the TCP acknowledgement, and generating the indication information indicating whether the RLC protocol entity unit of the data transmit end needs to generate the TCP acknowledgement; and
   if the TCP acknowledgement comprises data content, a header of the TCP acknowledgement comprises indication information used to indicate that the TCP acknowledgement is a synchronization data packet, the header of the TCP acknowledgement comprises indication information used to indicate that the TCP acknowledgement is a finish data packet, the header of the TCP acknowledgement comprises window size information, or a TCP option in the header of the TCP acknowledgement comprises at least one of multipath TCP information, selective acknowledgement information, a selective acknowledgement permitted option, or time stamp information, determining that the RLC protocol entity unit of the data transmit end does not need to generate the TCP acknowledgement, and generating indication information indicating that the RLC protocol entity unit of the data transmit end does not need to generate the TCP acknowledgement; or if the TCP acknowledgement does not comprise data content, a header of the TCP acknowledgement does not comprise indication information used to indicate that the TCP acknowledgement is a synchronization (SYN) packet, the header of the TCP acknowledgement does not comprise indication information used to indicate that the TCP acknowledgement is a finish data packet, the header of the TCP acknowledgement does not comprise window size information, and a TCP option in the header of the TCP acknowledgement does not comprise multipath TCP information, selective acknowledgement information, a selective acknowledgement permitted option, or time stamp information, determining that the RLC protocol entity unit of the data transmit end needs to generate the TCP acknowledgement, and generating indication information indicating that the RLC protocol entity unit of the data transmit end needs to generate the TCP acknowledgement.

3. The method according to claim 1, wherein the sending the indication information to the RLC protocol entity unit of the data transmit end comprises:
sending, by the RLC protocol entity unit of the data receive end, the indication information by using an RLC control protocol data unit or a media access control (MAC) control element.

4. The method according to claim 1, wherein if the indication information is used to indicate that the RLC protocol entity unit of the data transmit end needs to generate the TCP acknowledgement, the indication information further comprises:
indication information used to determine an acknowledgement number of the TCP acknowledgement that needs to be generated by the RLC protocol entity unit of the data transmit end.

5. The method according to claim 4, wherein the indication information is:
a sequence number that is of an acknowledgement of an RLC protocol data unit (PDU) and that is sent by the RLC protocol entity unit of the data receive end to the RLC protocol entity unit of the data transmit end.

6. The method according to claim 5, wherein before sending the indication information to the RLC protocol entity unit of the data transmit end, if the RLC protocol entity unit of the data receive end does not finish sending the sequence number of the acknowledgement of the RLC PDU to the RLC protocol entity unit of the data transmit end, the indication information is further used to indicate that the RLC PDU is correctly received.

7. The method according to claim 1, wherein the sending the indication information to the RLC protocol entity unit of the data transmit end comprises:
if the RLC protocol entity unit of the data receive end determines that the RLC protocol entity unit of the data transmit end does not need to generate the TCP acknowledgement, sending, by the RLC protocol entity unit of the data receive end, the indication information by using an RLC data PDU, wherein the RLC data PDU carries content of the TCP acknowledgement.

8. A data receiving device, comprising:
a processor, configured to:
determine whether a radio link control (RLC) protocol entity unit of the data receiving device receives a transmission control protocol (TCP) acknowledgement from a TCP protocol entity unit of the data receiving device;
when the TCP acknowledgement comprises data content, a header of the TCP acknowledgement comprises indication information used to indicate that the TCP acknowledgement is a synchronization data packet, the header of the TCP acknowledgement comprises indication information used to indicate that the TCP acknowledgement is a finish data packet, the header of the TCP acknowledgement comprises window size information, or a TCP option in the header of the TCP acknowledgement comprises at least one of multipath TCP information, selective acknowledgement information, a selective acknowledgement permitted option, or time stamp information, determining that a RLC protocol entity unit of the data transmit end does not need to generate the TCP acknowledgement, and generating indication information indicating that the RLC protocol entity unit of the data transmit end does not need to generate the TCP acknowledgement; and
a transmitter, configured to: when the processor determines that the RLC protocol entity unit of the data receiving device receives the TCP acknowledgement from the TCP protocol entity unit of the data receiving device, send indication information to an RLC protocol entity unit of a data transmit end.

9. The data receiving device according to claim 8, wherein the processor is further configured to:
before the transmitter sends the indication information to the RLC protocol entity unit of the data transmit end, determine whether the RLC protocol entity unit of the data transmit end needs to generate the TCP acknowledgement, and generate the indication information indicating whether the RLC protocol entity unit of the data transmit end needs to generate the TCP acknowledgement; and
if the TCP acknowledgement comprises data content, a header of the TCP acknowledgement comprises indication information used to indicate that the TCP acknowledgement is a synchronization data packet, the header of the TCP acknowledgement comprises indication information used to indicate that the TCP acknowledgement is a finish data packet, the header of the TCP acknowledgement comprises window size information, or a TCP option in the header of the TCP acknowledgement comprises at least one of multipath TCP information, selective acknowledgement information, a selective acknowledgement permitted option, or time stamp information, determine that the RLC protocol entity unit of the data transmit end does not need to generate the TCP acknowledgement, and generate indication information indicating that the RLC protocol entity unit of the data transmit end does not need to generate the TCP acknowledgement; or if the TCP acknowledgement does not comprise data content, a header of the TCP acknowledgement does not comprise indication information used to indicate that the TCP acknowledgement is a synchronization (SYN) packet, the header of the TCP acknowledgement does not comprise indication information used to indicate that the TCP acknowledgement is a finish data packet, the header of the TCP acknowledgement does not comprise window size information, and a TCP option in the header of the TCP acknowledgement does not comprise multipath TCP information, selective acknowledgement information, a selective acknowledgement permitted option, or time stamp information, determine that the RLC protocol entity unit of the data transmit end needs to generate the TCP acknowledgement, and generate indication information indicating that the RLC protocol entity unit of the data transmit end needs to generate the TCP acknowledgement.

10. The data receiving device according to claim 8, wherein the transmitter sends the indication information to the RLC protocol entity unit of the data transmit end in the following manner:
sending the indication information by using an RLC control protocol data unit or a media access control (MAC) control element.

11. The data receiving device according to claim 8, wherein if the indication information is used to indicate that the RLC protocol entity unit of the data transmit end needs to generate the TCP acknowledgement, the indication information further comprises:
indication information used to determine an acknowledgement number of the TCP acknowledgement that needs to be generated by the RLC protocol entity unit of the data transmit end.

12. The data receiving device according to claim 11, wherein the indication information used to determine the acknowledgement number of the TCP acknowledgement that needs to be generated by the RLC protocol entity unit of the data transmit end is:
a sequence number that is of an acknowledgement of an RLC protocol data unit (PDU) and that is sent by the RLC protocol entity unit of the data receiving device to the RLC protocol entity unit of the data transmit end.

13. The data receiving device according to claim 12, wherein before the transmitter sends the indication information to the RLC protocol entity unit of the data transmit end, if the transmitter does not finish sending the sequence number of the acknowledgement of the RLC PDU to the RLC protocol entity unit of the data transmit end, the indication information is further used to indicate that the RLC PDU is correctly received.

14. The data receiving device according to claim 8, wherein the transmitter sends the indication information to the RLC protocol entity unit of the data transmit end in the following manner:
if the RLC protocol entity unit of the data transmit end does not need to generate the TCP acknowledgement, sending the indication information by using an RLC data PDU, wherein the RLC data PDU carries content of the TCP acknowledgement.

15. A data sending device, comprising:
a receiver, configured to:
receive indication information from a radio link control (RLC) protocol entity unit of a data receive end, wherein the indication information is used to indicate whether an RLC protocol entity unit of the data sending device needs to generate a transmission control protocol (TCP) acknowledgement;
when the TCP acknowledgement comprises data content, a header of the TCP acknowledgement comprises indication information used to indicate that the TCP acknowledgement is a synchronization data packet, the header of the TCP acknowledgement comprises indication information used to indicate that the TCP acknowledgement is a finish data packet, the header of the TCP acknowledgement comprises window size information, or a TCP option in the header of the TCP acknowledgement comprises at least one of multipath TCP information, selective acknowledgement information, a selective acknowledgement permitted option, or time stamp information, determine that a RLC protocol entity unit of the data transmit end does not need to generate the TCP acknowledgement, and generate indication information indicating that the RLC protocol entity unit of the data transmit end does not need to generate the TCP acknowledgement; and
a transmitter, configured to send a TCP acknowledgement to a TCP protocol entity unit of the data sending device based on the indication information received by the receiver.

16. The data sending device according to claim 15, wherein the data sending device further comprises a processor,
the processor is configured to generate the TCP acknowledgement based on the indication information, and the transmitter is further configured to send the generated TCP acknowledgement to the TCP protocol entity unit of the data sending device.

17. The data sending device according to claim 16, wherein the processor generates the TCP acknowledgement based on the indication information in the following manner:
generating the TCP acknowledgement based on indication information that is comprised in the indication information and that is used to determine an acknowledgement number of the TCP acknowledgement that needs to be generated by the RLC protocol entity unit of the data sending device.

18. The data sending device according to claim 17, wherein the processor generates the TCP acknowledgement in the following manner based on the indication information that is comprised in the indication information and that is used to determine the acknowledgement number of the TCP acknowledgement that needs to be generated by the RLC protocol entity unit of the data sending device:
determining, based on a sequence number that is of an acknowledgement of an RLC protocol data unit (PDU) and that is comprised in the indication information, the acknowledgement number of the TCP acknowledgement that needs to be generated, wherein the RLC PDU is sent by the RLC protocol entity unit of the data receive end to the RLC protocol entity unit of the data sending device; and
generating the TCP acknowledgement based on the acknowledgement number of the TCP acknowledgement.

19. The data sending device according to claim 17, wherein the processor is further configured to:
after the receiver receives the indication information from the RLC protocol entity unit of the data receive end, if the RLC protocol entity unit of the data receive end does not finish sending a sequence number of an acknowledgement of an RLC PDU, acknowledge, based on the indication information, that the RLC PDU is correctly received.

20. The data sending device according to claim 15, wherein the transmitter is configured to: before the receiver receives the indication information from the RLC protocol entity unit of the data receive end, send an RLC protocol data unit (PDU) to the RLC protocol entity unit of the data receive end; and the data sending device further comprises a processor, configured to: when the RLC PDU is a last fragment of an RLC service data unit (SDU), add a poll indication to the RLC PDU, and trigger the RLC protocol entity unit of the data receive end to send an RLC acknowledgement.

* * * * *

UNITED STATES PATENT AND TRADEMARK OFFICE
CERTIFICATE OF CORRECTION

| | | |
|---|---|---|
| PATENT NO. | : 10,932,159 B2 | Page 1 of 1 |
| APPLICATION NO. | : 16/267982 | |
| DATED | : February 23, 2021 | |
| INVENTOR(S) | : Lin et al. | |

It is certified that error appears in the above-identified patent and that said Letters Patent is hereby corrected as shown below:

On the Title Page

Page 2, item (56) Foreign Patent Documents Citation No. 5: "CN 104137507 11/2018" should read -- CN 104137507 B 11/2018 --.

Signed and Sealed this
Twelfth Day of July, 2022

Katherine Kelly Vidal
*Director of the United States Patent and Trademark Office*